United States Patent
Salleo et al.

(10) Patent No.: US 7,879,390 B2
(45) Date of Patent: Feb. 1, 2011

(54) SURFACE ENERGY CONTROL METHODS FOR COLOR FILTER PRINTING

(75) Inventors: Alberto Salleo, San Francisco, CA (US); Steven E. Ready, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 869 days.

(21) Appl. No.: 11/755,717

(22) Filed: May 30, 2007

(65) Prior Publication Data

US 2008/0299327 A1     Dec. 4, 2008

(51) Int. Cl.
*B05D 5/06* (2006.01)

(52) U.S. Cl. .................. 427/162; 427/595; 216/24; 216/67

(58) Field of Classification Search ............ 216/24, 216/67; 427/162, 595
See application file for complete search history.

(56) References Cited

U.S. PATENT DOCUMENTS

| | | | |
|---|---|---|---|
| 6,736,484 B2 | 5/2004 | Nakamura | |
| 6,755,983 B2 | 6/2004 | Yudasaka | |
| 6,801,237 B2 | 10/2004 | Gaudiana et al. | |
| 6,806,925 B2 * | 10/2004 | Ishii et al. | 349/106 |
| 6,815,125 B1 * | 11/2004 | Okabe et al. | 430/7 |
| 6,830,856 B2 | 12/2004 | Tsai et al. | |
| 2003/0231272 A1 * | 12/2003 | Nakamura et al. | 349/123 |
| 2004/0002225 A1 * | 1/2004 | Wong et al. | 438/745 |
| 2006/0115749 A1 | 6/2006 | Toyoda | |
| 2007/0186791 A1 * | 8/2007 | Kim et al. | 101/151 |
| 2008/0095985 A1 * | 4/2008 | Frey et al. | 428/156 |

FOREIGN PATENT DOCUMENTS

JP     2005-165073 A     6/2005

* cited by examiner

*Primary Examiner*—Shamim Ahmed
(74) *Attorney, Agent, or Firm*—Bever, Hoffman & Harms, LLP; Patrick T. Bever

(57) ABSTRACT

Black matrix (BM) material is deposited on glass and patterned to form walls that define an array of wells. Various surface treatments and masking schemes are utilized to achieve surface energy control of the BM glass. The surface treatments include one or more of chemically treating the BM walls by depositing hydrophobic self-assembled monolayers on the uppermost wall surfaces, and plasma treatments to control the surface energy of the various BM glass surfaces. Masking processes include backside exposure and development of photoresist, and maskless, self-aligned photo-patterning of the monolayers. Color filter ink is then injected into each well from an ink jet print head. The high surface energy of the lower and side wall surfaces facilitates wetting of the ink, and the low surface energy of the monolayers prevents intermixing of ink between adjacent wells. The ink then dries to form a color filter in each well.

23 Claims, 24 Drawing Sheets

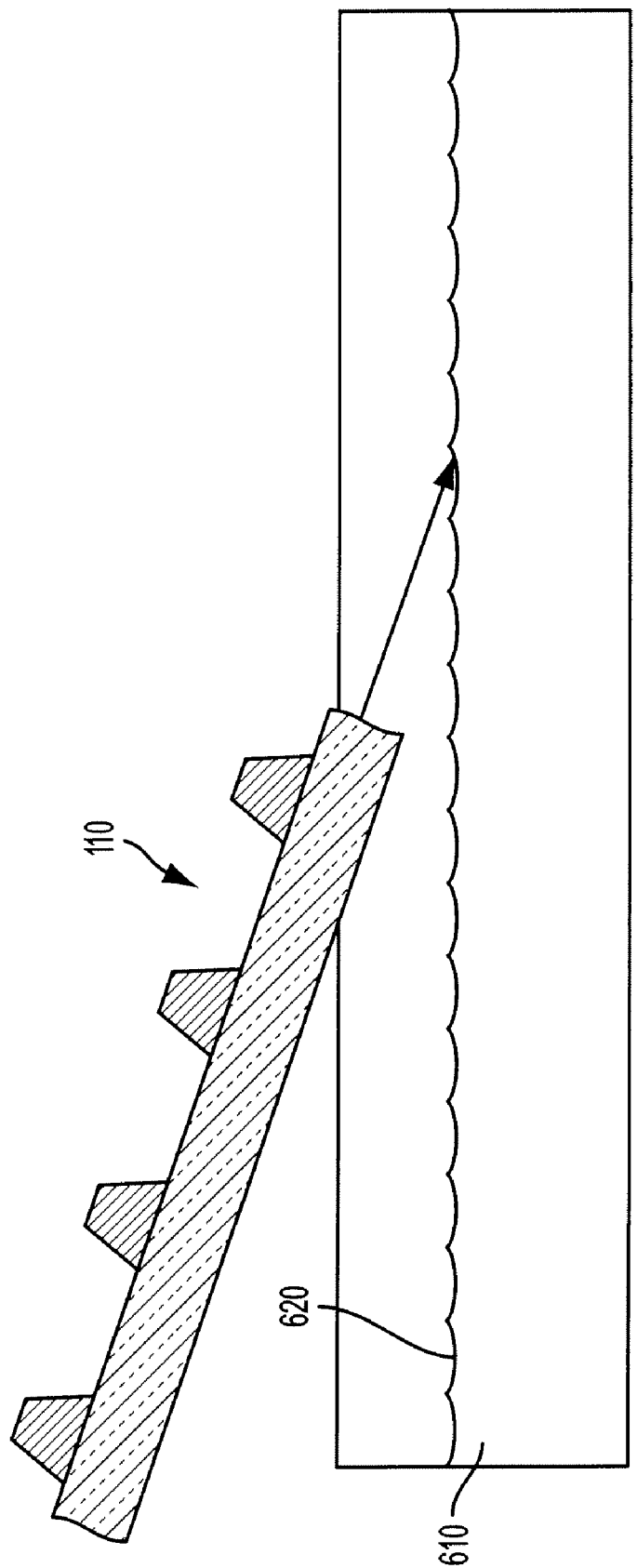

SURFACE ENERGY CONTROL METHODS FOR COLOR FILTER PRINTING

FIELD OF THE INVENTION

This invention relates to liquid crystal displays (LCDs), and in particular to methods for producing color filter arrays for color LCDs using an ink jet system.

BACKGROUND OF THE INVENTION

Recent increases in demand for low-cost color Liquid Crystal Displays (LCDs) (for example, for use in portable "laptop" personal computers) have driven the need to develop increasingly more cost-effective LCD production methods. Color LCDs generally include a color filter array including individual colored filters (e.g., red (R), green (G) and blue (B)) that are formed over a liquid crystal material. During operation, the liquid crystal material is controlled to selectively pass or block light from passing through the color filter array in a way that creates a desired image.

Early conventional three-step processes for producing LCD color filters required separate processing steps for each of the three R, G and B color filters. For example, a dye-based process involved photolithographically patterning a water-soluble polymer material on a glass substrate, and then dipping the substrate in a dye bath to obtain a mono-colored (e.g., R) pattern. The patterning and dipping process is repeated three times to form the desired R, G and B color filter pattern. As another example, a pigment-based process involved patterning a photosensitive resin layer containing a color pigment on a substrate, and repeating for each of the three colors R, G and B. Problems with these conventional three-step processes include (a) the need to repeat essentially the same process three times is inherently more expensive than methods requiring a single processing step to produce all three color filters, and (b) an alignment defect occurring during any of the three repeated processes requires that the entire color filter array be scrapped, thus reducing production yields over single-step solutions.

A more recently proposed method for producing LCD color filters that addresses the problems associated with multi-step processes involves utilizing an ink jet system to "print" R, G and B color filter ink material in a single pass onto predetermined regions on a glass substrate. In this method, a black matrix (BM) material (e.g., polyimid) is deposited on a glass sheet and patterned to define an array of wells or basins separated by raised walls. The resulting BM glass structure is then passed under an ink jet head, which is controlled using known techniques to print (eject) small quantities (drops) of the color filter ink (i.e., color filter material dispersed in a solvent) into each of the wells. In theory, the raised walls surrounding each well serve to contain the color filter ink printed into that well until the ink has dried, thereby preventing intermixing of the different colored ink materials. After the color filter ink dries, the residual color filter material in each of the wells forms the desired RGB color filter array.

A problem with the ink jet approach arises because a relatively large amount of color filter ink is needed to produce a suitable color filter. After the color filter ink is printed (i.e., ejected from the ink jet head) into a well, the solvent evaporates from the color filter ink, leaving solid color filter material in the well. Due to the relatively large amount of solvent disposed in a given volume of color filter ink, and because the required thickness of the color filter film is comparable to the thickness of the BM walls, the volume of color filter ink entirely fills each well such that the ink extends above an upper surface of the BM walls, which can result in intermixing with adjacent ink quantities before the drying process is complete.

What is needed is an efficient method for producing color filter arrays for LCDs using ink jet technology that addresses the problems set forth above. In particular, what is needed is an efficient method for producing BM glass structures such that the color filter ink wets to the bottom surface and side walls of each well, and de-wets from the top surface of each well, thereby causing the color filter ink to reliably form a bead within the well, thereby forming the desired color filter structure when the ink dries.

SUMMARY OF THE INVENTION

The present invention is directed to methods for producing color filter arrays, for example, on black matrix (BM) glass in which various surface treatments and masking schemes are utilized to achieve surface energy control of the BM glass to facilitate ink jet printing of color filter ink into wells formed on the BM glass. In particular, the present invention involves depositing hydrophobic material to decrease the surface energy on the upper wall surfaces surrounding each well, and/or chemically treating the lower wall surfaces and glass surfaces to increase the surface energy in the lower portions of each well. The various surface treatments and masking schemes disclosed herein provide highly efficient and cost effective methods for controlling the differential surface-energy of the walls surrounding the ink-receiving wells to help contain the subsequently injected color filter ink drops inside their associated well, thereby preventing intermixing of the injected color filter ink.

In accordance with a first specific embodiment of the present invention, the BM glass is subjected to an initial activation treatment that involves exposing the BM glass to a radio-frequency (RF) plasma in an oxygen ($O_2$) environment, which has the effect of increasing the surface energies of the various well surfaces, and then hydrophobic material in the form of a self-assembled monolayer (e.g., octadecyl-trichlorosilane (OTS)) is applied by way of a flat elastomeric stamp. The stamp includes a suitable base with a layer of hydrophobic material (e.g., OTS in a hexadecane solution) formed thereon. Deposition of hydrophobic material is then performed by conformally contacting the flat elastomeric stamp such that hydrophobic material layer only contacts the upper wall surfaces bordering each of wells. The high surface energy generated during a previous activation process causes portions of hydrophobic material layer to adhere to the upper wall surfaces with sufficient force such that the hydrophobic material portions remain adhered to the upper wall surfaces when the stamp is subsequently removed. The side wall surfaces and lower surfaces of the wells, which are not contacted by the stamp, have relatively high surface energies, causing the injected color filter ink to wet them.

In accordance with other embodiments, hydrophobic material is applied as a coating layer by way of a bath such that the hydrophobic material covers all surfaces of the BM glass, and then the hydrophobic material layer is selectively removed from the lower well surfaces using various masking schemes and/or treated to achieve a high surface energy. In one specific embodiment, the coated BM glass is then pressed against a sheet, placed in an $O_2$ environment, and the subjected to a backside exposure process in which ultraviolet (UV) light is passed through the transparent substrate and onto the hydrophobic material. Under these conditions the OTS layer is etched away (or otherwise removed/deactivated) only in those areas where UV radiation and $O_2$ coexist because the etching reaction proceeds through the formation of $O_3$. This etching process produces a "micro-reactor" adjacent to the lower surfaces of each well, thereby removing the OTS material from these regions, but retains the OTS material on the upper surfaces of the walls surrounding the wells, thereby achieving the desired differential energy profile. In another embodiment a frontside exposure is performed through a transparent cover sheet (e.g. quartz) whose absorption spectrum is such as to let enough UV radiation through to produce the desired $UV/O_2$ micro-reaction. In yet another embodiment, after performing the activation and forming the OTS coating, a photoresist layer is spun over OTS layer and patterned using a backside exposure/development process, and then the exposed portions of the photoresist layer are removed (stripped) to expose the side wall and lower portions of the OTS layer. The exposed OTS portions are then removed using an $O_2$ RF plasma treatment.

In other embodiments, an image reversal process is utilized in which a photoresist mask is formed directly over the BM glass surface, and then portions of the mask located over the upper wall surfaces are removed, and the exposed surfaces are subjected to a bath containing a hydrophobic material (e.g., OTS in a suitable solution).

In accordance with another embodiment, a photodefinable surface treatment is formed on the BM glass that has the property of changing phobicity (i.e., surface energy) upon UV exposure. In one embodiment, a backside exposure is used to change the phobicity of the material disposed on the lower well surfaces, and uses the walls of the BM glass to mask the upper wall surfaces, thereby maintaining the initial hydrophobic characteristics the material in these regions.

BRIEF DESCRIPTION OF THE DRAWINGS

These and other features, aspects and advantages of the present invention will become better understood with regard to the following description, appended claims, and accompanying drawings, where:

FIGS. 6(A), 6(B), 6(C) and 6(D) are simplified cross-sectional side views depicting a method for producing a color filter array according to another specific embodiment of the present invention;

DETAILED DESCRIPTION OF THE DRAWINGS

The present invention relates to an improvement in methods for producing color filter arrays that are used, for example, in LCDs. The following description is presented to enable one of ordinary skill in the art to make and use the invention as provided in the context of a particular application and its requirements. As used herein, directional terms such as "upper", "lower", "downward", "front", "rear", are intended to provide relative positions for purposes of description, and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1A:
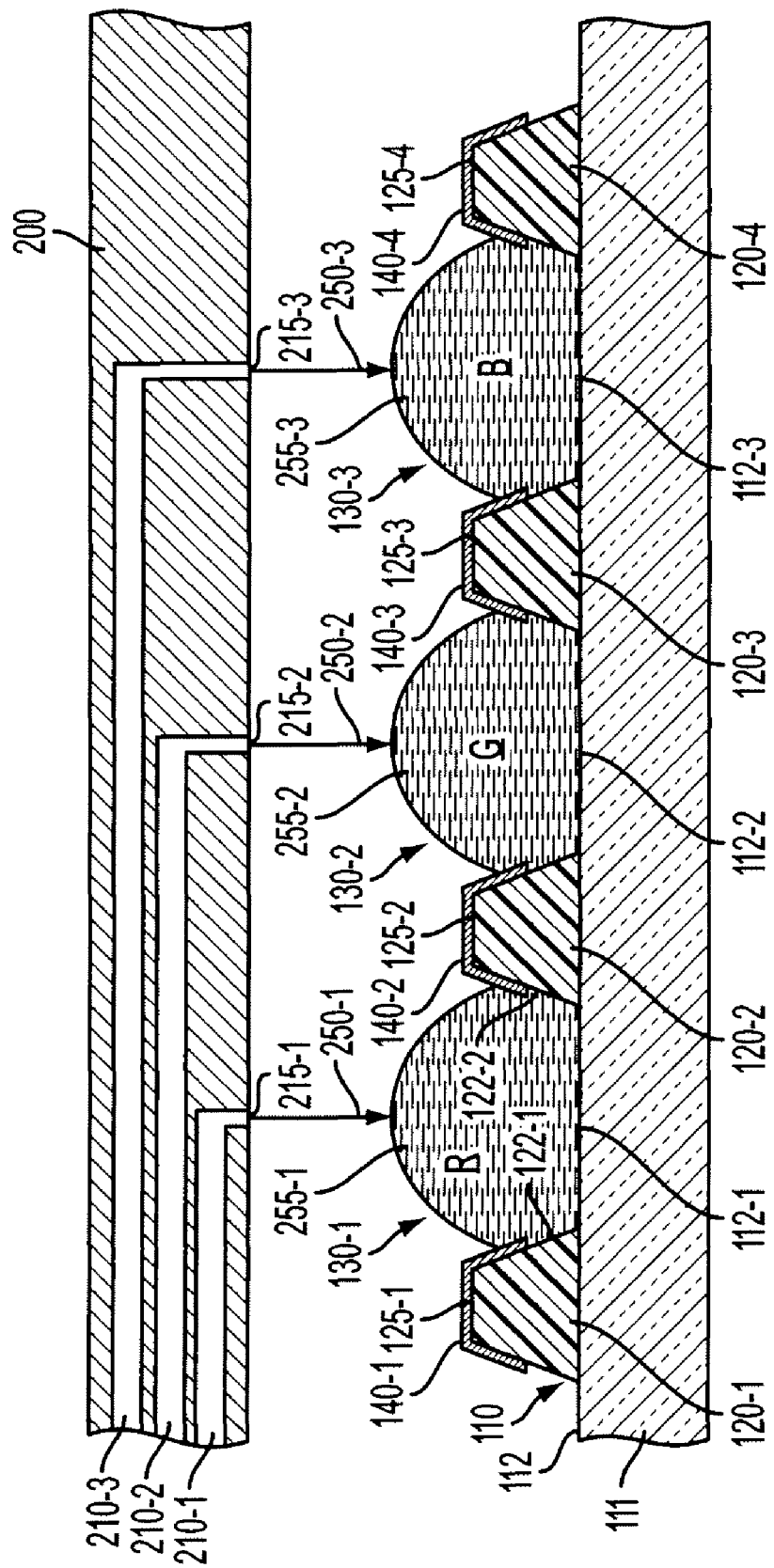
FIGS. 1(A) and 1(B) are simplified cross-sectional side views depicting a generalized method for producing a color filter array according to the present invention.
Figure 1B:
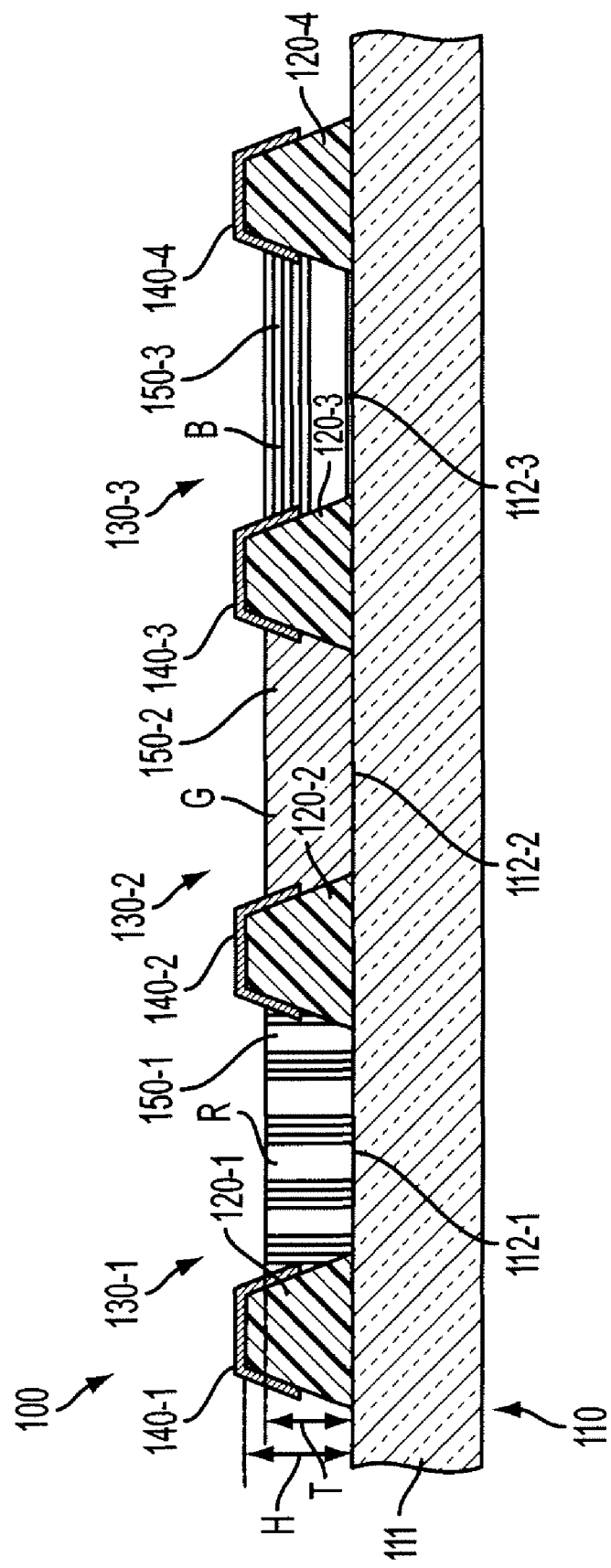

FIGS. 1(A) and 1(B) are simplified cross-sectional side views depicting a generalized method for producing a color filter array 100 according to the present invention. Referring to FIG. 1(A), the method generally involves inserting (e.g., ejecting or otherwise printing) red ("R"), green ("G") and blue ("B") color filter ink drops 255-1 to 255-3 into corresponding wells (depressions) 130-1 to 130-3 that are formed on black matrix (BM) glass (or other base structure) 110, and then, as shown in FIG. 1(B), curing or otherwise drying the color filter ink such that they form R, G and B color filters 150-1 to 150-3 on BM glass 110. In accordance with the present invention, as described in additional detail below, BM glass 110 is subjected to various surface treatments and/or masking schemes to deposit hydrophobic material portions 140-1 to 140-4 in a way that helps contain the subsequently injected color filter ink drops 255-1 to 255-3 inside their associated well, thereby preventing intermixing of color filter ink 255-1 to 255-3.

Figure 2A:
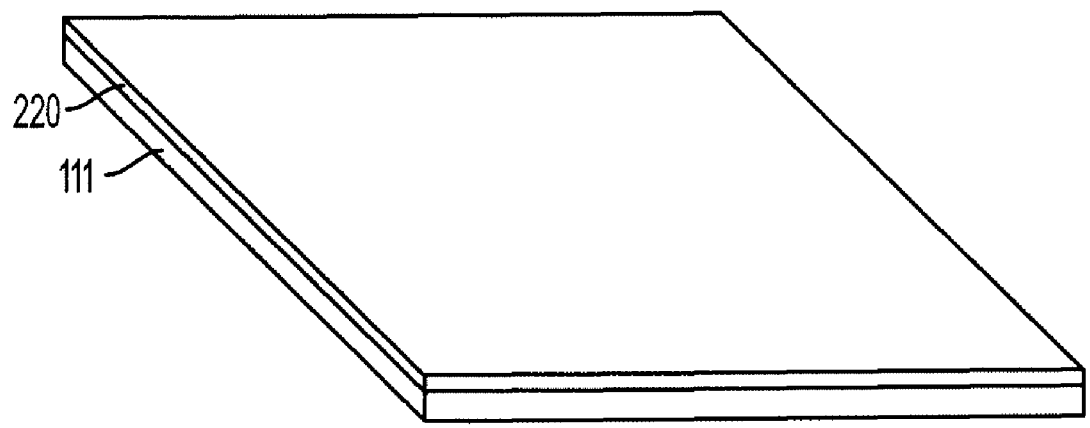
FIGS. 2(A) and 2(B) are simplified perspective views depicting a simplified method for producing a BM glass structure utilized in the color filter array of FIG. 1(B)
Figure 2B:
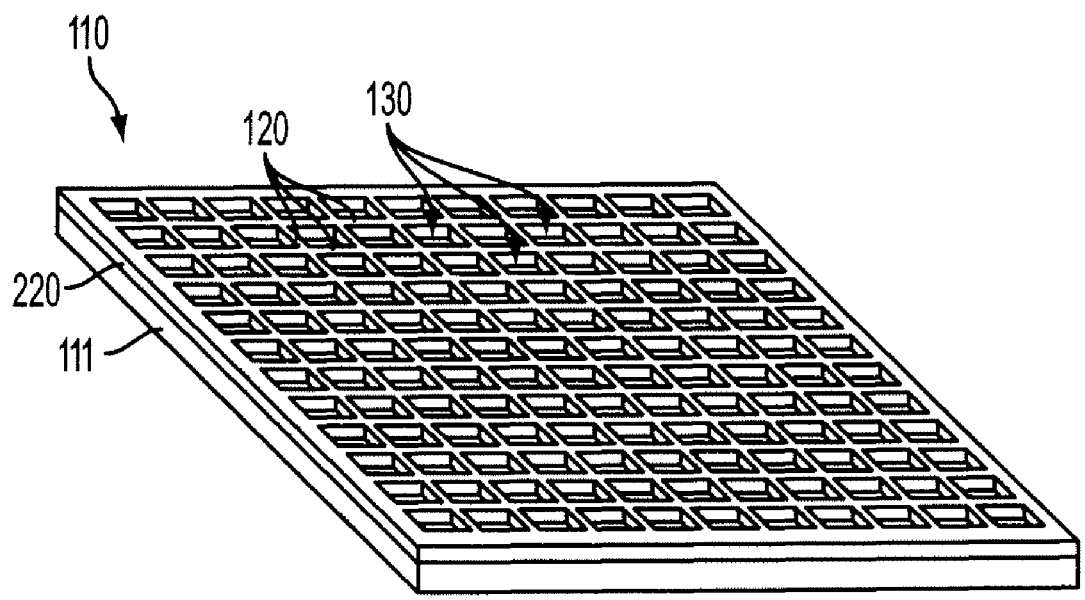
Figure 3:
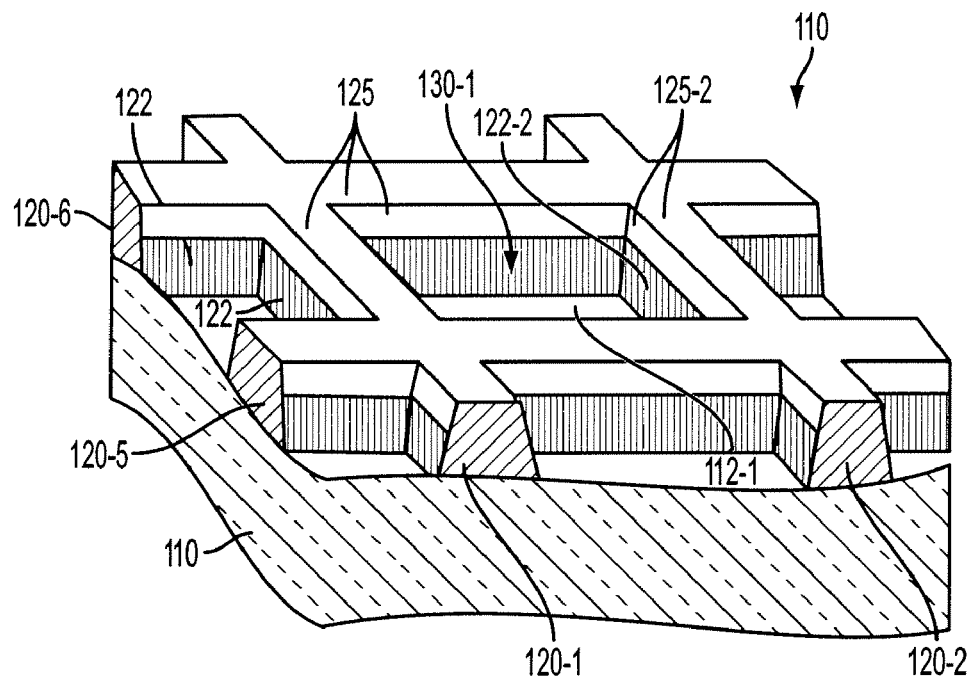
FIG. 3 is an enlarged partial perspective view showing a single well of the BM glass structure of FIG. 2(B)

FIGS. 2(A) and 2(B) depict a simplified method for producing BM glass 110 utilizing manufacturing techniques that are well known in the art. Referring to FIG. 2(A), a polyimide-based resin ("black matrix") layer 220 is formed on a glass (or other light transparent material) substrate 111. As indicated in FIG. 2(B), black matrix layer 220 is then photolithographically patterned and etched such that (e.g., rectangular) portions of black matrix layer 220 are removed to form a matrix of well openings 130 defined between corresponding portions of elongated walls 120. FIG. 3 is an enlarged portion showing a portion of BM glass 110 that includes a representative well 130-1. As referred to herein, each rectangular well 130 (e.g., well 130-1) is defined by corresponding portions of walls 120 (e.g., walls 120-1, 120-2, 120-5 and 120-6), and by the surface portion (e.g., surface portion 112-1) that is surrounded by these walls. In particular, well 130-1 includes lower surface 112-1, side wall surfaces 122 (e.g., side wall surface 122-2) of the portions of walls 120-1, 120-2, 120-5 and 120-6 surrounding lower surface 112-1, and the upper wall surfaces 125 (e.g., upper wall surface 125-2) of the portions of walls 120-1, 120-2, 120-5 and 120-6 surrounding lower surface 112-1.

In the following description, the term "upper wall surface" is intended to mean the upper plateau (if present) and/or the uppermost portions of walls 120 that extend down from this upper plateau. As indicated in FIG. 3, the light shaded regions along the upper portions of walls 120-1, 120-2, 120-5 and 120-6 indicate that upper wall surfaces 125 are not limited to the uppermost plateau of the elongated walls, but may extend partially (e.g., one third of the way) down the sides of each wall 120. Side wall surfaces 122, which are indicated by the somewhat darker shading along walls 120-1, 120-2, 120-5 and 120-6 in FIG. 3, are disposed between the upper wall surfaces 125 and surface 112 of substrate 111.

In addition, the invention is described below in two-dimensions (2-D) for brevity. It is understood that the treatments and masking schemes described below with reference to the 2-D description (e.g., as applied to walls 120-1 and 120-2) are also applied to the non-depicted walls (e.g., walls 120-5 and 120-6) in the three-dimensional context shown in FIG. 3.

Referring again to the upper portion of FIG. 1(A), the insertion of color filter ink drops 255-1 to 255-3 into corresponding wells 130-1 to 130-3 is achieved using an ink jet head 200, which is depicted in a simplified form for illustrative purposes. Ink jet head 200 includes flow channels 210-1 to 210-3 for transporting liquid color filter ink to corresponding nozzles 215-1 to 215-3. Ink jet head 200 is positioned over BM glass 110 using known techniques such that nozzles 215-1 to 215-3 are located over corresponding wells 130-1 to 130-3. Ink jet head 200 is then actuated according to known techniques to eject predetermined quantities of the color filter inks (indicated by arrows 250-1 to 250-3), thereby forming color filter ink drops 255-1 to 255-3 that respectively fill wells 130-1 to 130-3. Color filter ink drops 255-1 to 255-3 are then cured or otherwise dried, whereby residual color filter material disposed in each color filter ink drops 255-1 to 255-3 forms a corresponding color filter 150-1 to 150-3 in an associated well 130-1 to 130-3, as depicted in FIG. 1(B).

The color filter printing process depicted in FIGS. 1(A) and 1(B) requires differential control of the surface energy of the BM glass 110. The volume of the dried color filters 150-1 to 150-3 (see FIG. 1(B)) is typically approximately 20% of the volume of color filter ink drops 255-1 to 255-3 (see FIG. 1(A)). Referring to the left side of FIG. 1(B), the required thickness of the color filters 150-1 to 150-3 is approximately 1.5 to 2 µm, which is comparable to the height H of walls 120-1 to 120-4 (ideally, the thickness T of the color filters is equal to the height H of the walls). Therefore, the volume of color filter ink drops 255-1 to 255-3 is larger than the volume defined by wells 130-1 to 130-3 on BM glass 110, which can result in overflow and intermixing of color filter ink drops 255-1 to 255-3.

To prevent this overflow/intermixing, in accordance with the present invention, at least some of the surfaces of each well 130-1 to 130-3 are chemically treated to cause each color filter ink drop 255-1 to 255-3 to wet (adhere) to the lower surface and side wall surfaces of its associated well, and to de-wet (repel) from the upper wall surfaces surrounding its associated well. In particular, with reference to wells 130-1 to 130-3 in FIG. 1(A), upper wall surfaces 125-1 to 125-4 are chemically treated to include hydrophobic material portions 140-1 to 140-4, respectively, such that upper wall surfaces 125-1 to 125-4 surrounding each well 130-1 to 130-3 have a relatively low (first) surface energy, and the surfaces inside each well 130-1 to 130-3 (e.g., side wall surfaces 122-1 and 122-2 and lower surface 112-1 of well 130-1) have a relatively high (second) surface energy. In one embodiment, hydrophobic material portions 140-1 to 140-4 include a self-assembling monolayer (SAM) such as octadecyl-trichlorosilane (OTS). Because the (second) surface energy inside each well 130-1 to 130-3 is higher than the (first) surface energy along the peripheral upper wall surfaces 125-1 to 125-4, color filter ink drops 255-1 to 255-3 are wetted to the inside surface of wells 130-1 to 130-3, and de-wetted from the upper wall surfaces 125-1 to 125-4 surrounding each well. Consequently, color filter ink drops 255-1 to 255-3 are confined within corresponding wells 130-1 to 130-3, causing color filter ink drops 255-1 to 255-3 to form domed beads, as depicted in FIG. 1(A).

The present invention is particularly directed to methods for achieving the surface energy control described above, and is described in detail with reference to the following specific examples. In all the following embodiments, chemical treatments are used to control the surface-energy of the BM glass. The molecules listed are specific examples from actual experiments, but are not intended to be limiting. Further, the various deposition methods described below are also intended to be exemplary. For example, the dip-coating deposition used in several of the specific embodiments below may be replaced with vapor deposition without in principle affecting the result.

Figure 4:
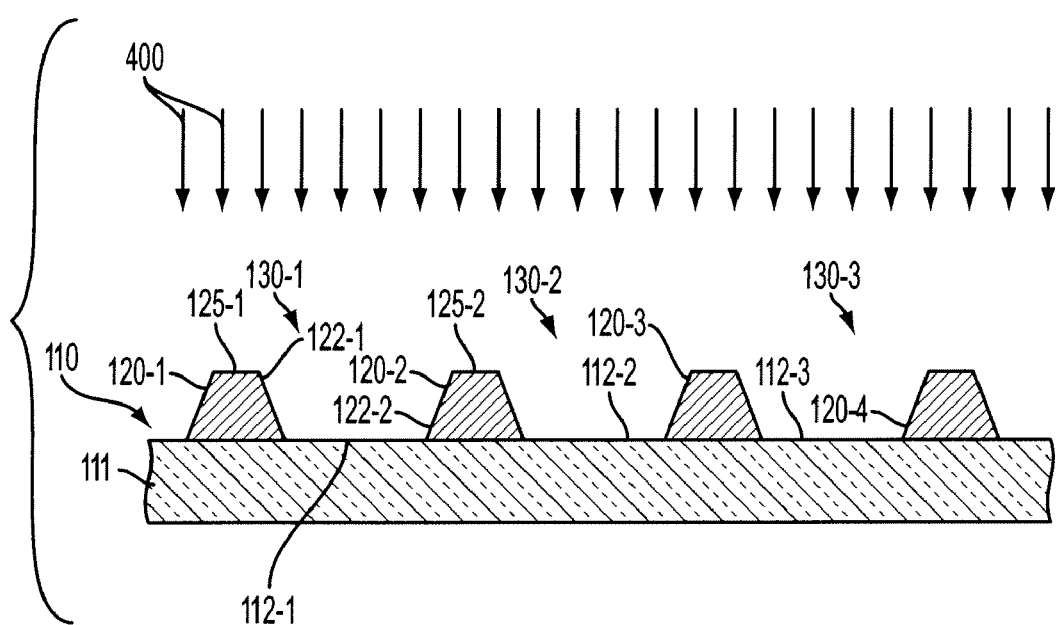
FIG. 4 is a simplified cross-sectional side view depicting a surface activation process utilized in accordance with an embodiment of the present invention.

FIG. 4 depicts an optional initial surface treatment that is utilized in at least some of the specific embodiments described below before depositing the hydrophobic material. The initial surface treatment involves activating the various surfaces of BM glass 110 such that surface energies of each well 130-1 to 130-2 are increased. For example, the initial treatment involves increasing the surface energies associated with well 130-1 by treating lower surface 112-1, side wall surfaces 122-1 and 122-2, and upper wall surfaces 125-1 and 125-2 of walls 120-1 and 120-2. Similarly, the activation process increases the surface energies of wells 130-2 and 130-3 by activating lower surfaces 112-2 and 112-3, and the surfaces of walls 120-3 and 120-4. In a specific embodiment, the activating process is performed by exposing BM glass 110 to a radio-frequency (RF) plasma 400 in an oxygen ($O_2$) environment. This activation process serves dual purposes. First, activation of the lower surfaces and side wall surfaces increases the wettability of the subsequently injected color filter ink. Second, activation of the upper wall surfaces increases their adherence to the subsequently applied hydrophobic material. That is, although initially activating the upper wall surfaces 125-1 and 125-2 would cause undesirable wetting of color filter ink 255-1 (see FIG. 1(A)), the functionalized upper wall surfaces 125-1 and 125-2 facilitates the reliable adherence of hydrophobic material portions 140-1 and 140-2.

The following specific embodiments set forth various additional surface treatments and masking schemes that facilitate the formation of hydrophobic material portions (e.g., portions 140-1 and 140-2; see FIG. 1(A)) such that they are present only on the upper wall surfaces (e.g., surfaces 125-1 and 125-2) surrounding each well, and such that the lower surfaces and side wall surfaces of each well achieve a relatively high surface energy state (e.g., as generated by the activation process described above with reference to FIG. 4).

Figure 5A:
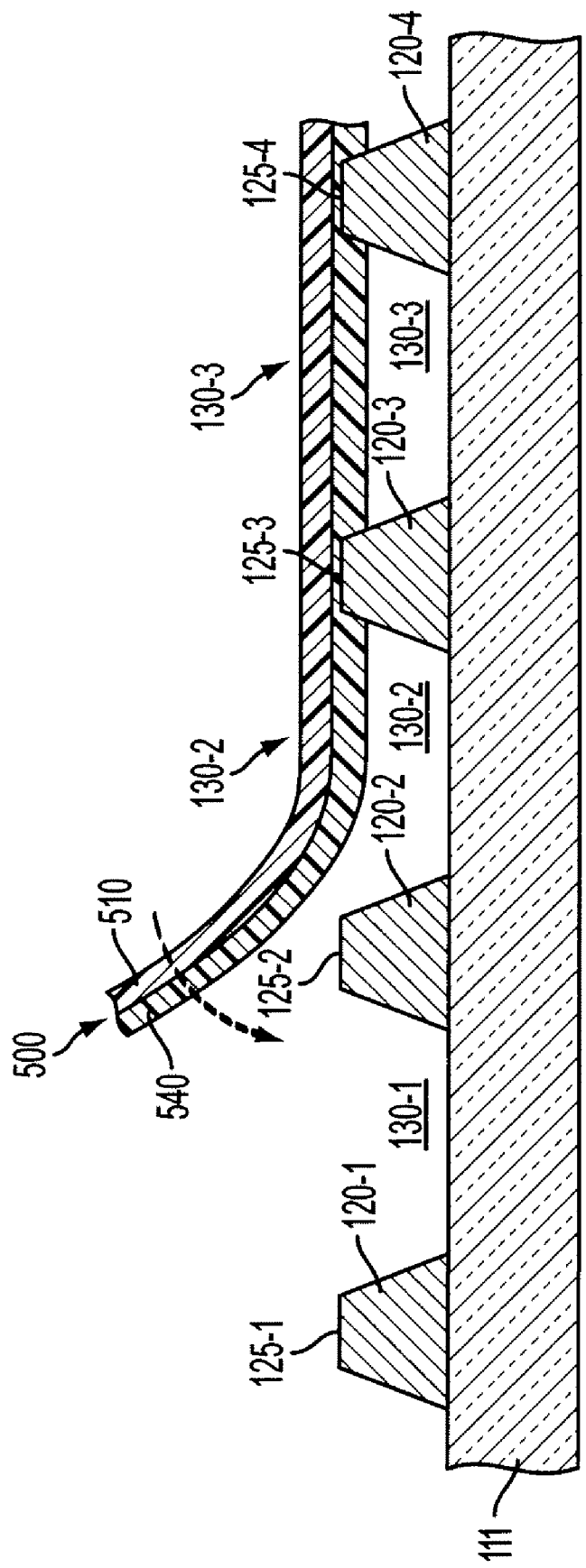
FIGS. 5(A), 5(B) and 5(C) are simplified cross-sectional side views depicting a method for producing a color filter array according to a specific embodiment of the present invention.
Figure 5B:
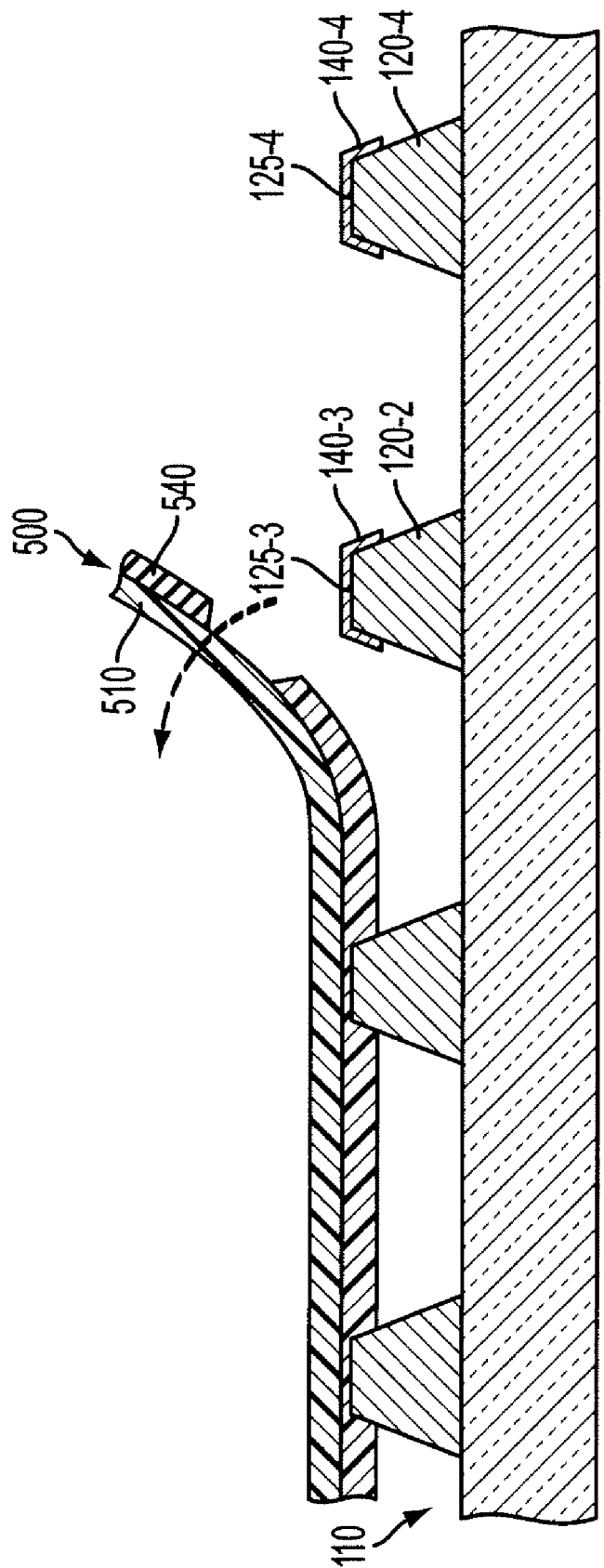
Figure 5C:
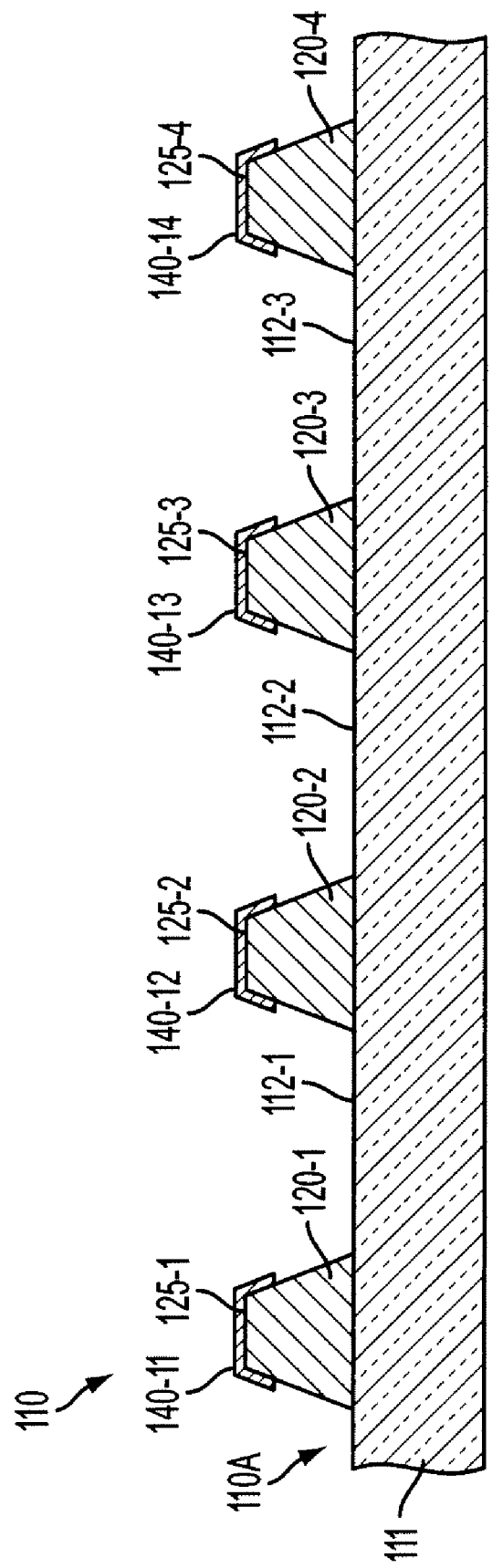

FIGS. 5(A) to 5(C) are simplified cross-sectional side views showing a first specific embodiment in which the hydrophobic material is a self-assembled monolayer (e.g., OTS) that is applied by way of a flat elastomeric stamp 500. In one embodiment, stamp 500 includes a suitable base 510 (e.g., Polydimethylsiloxane (PDMS)), and a hydrophobic material layer 540 (e.g., OTS in a hexadecane solution) disposed on base 510. The process shown in FIGS. 5(A) to 5(C) is performed after activating the surfaces of BM glass 110 using the activation process described above with reference to FIG. 4. As shown in FIG. 5(A), deposition of hydrophobic material onto walls 120-1 to 120-4 is achieved by conformally contacting flat elastomeric stamp 500 onto walls 120-1 to 120-4 such that hydrophobic material layer 540 only contacts upper wall surfaces 125-1 to 125-4 bordering each of wells 130-1 to 130-3. The high surface energy generated during the activation process causes portions of hydrophobic material layer 540 to adhere to upper wall surfaces 125-1 to 125-4 with sufficient force such that, as indicated in FIG. 5(B), hydrophobic material portions (e.g., portions 140-3 and 140-4) remain adhered to the upper wall surfaces (e.g., upper wall surfaces 125-3 and 125-4) of each wall of BM glass 110. FIG. 5(C) shows BM glass 110 after the stamping process is complete. Note that because of the activation process, the side wall surfaces of walls 120-1 to 120-4 and lower surfaces 112-1 to 112-3 have higher surface energies than upper wall surfaces 125-1 to 125-4 due to the presence of SAM/OTS hydrophobic material portions 140-1 and 140-4. With this structure, the low surface-energy at upper wall surfaces 125-1 to 125-4 will cause the injected color filter ink to have a high contact angle, which prevents spilling into a neighboring well. Conversely, the high surface energy of the side wall surfaces and lower surface, due to the $O_2$ plasma treatment, will cause the ink to wet them. Note that OTS is not the only hydrophobic material choice—the OTS SAM can be replaced by any molecule that will bind to the activated BM glass surface and has a low surface-energy in its bound form.

FIGS. 6(A)-6(D), 7, and 8(A)-8(E) depict three specific embodiments in which hydrophobic material is applied as a coating layer by way of a bath such that the hydrophobic material covers all surfaces of the activated BM glass, and then the hydrophobic material layer is selectively removed from the lower well surfaces using various masking schemes and/or treatments to achieve a high surface energy.

Figure 6B:
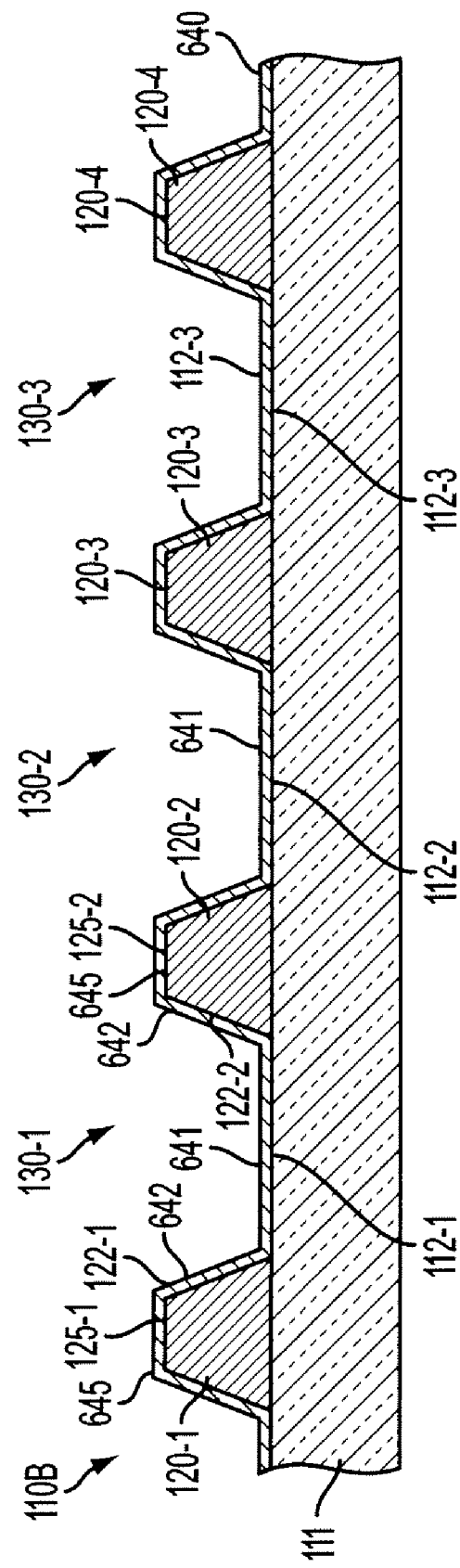
Figure 6C:
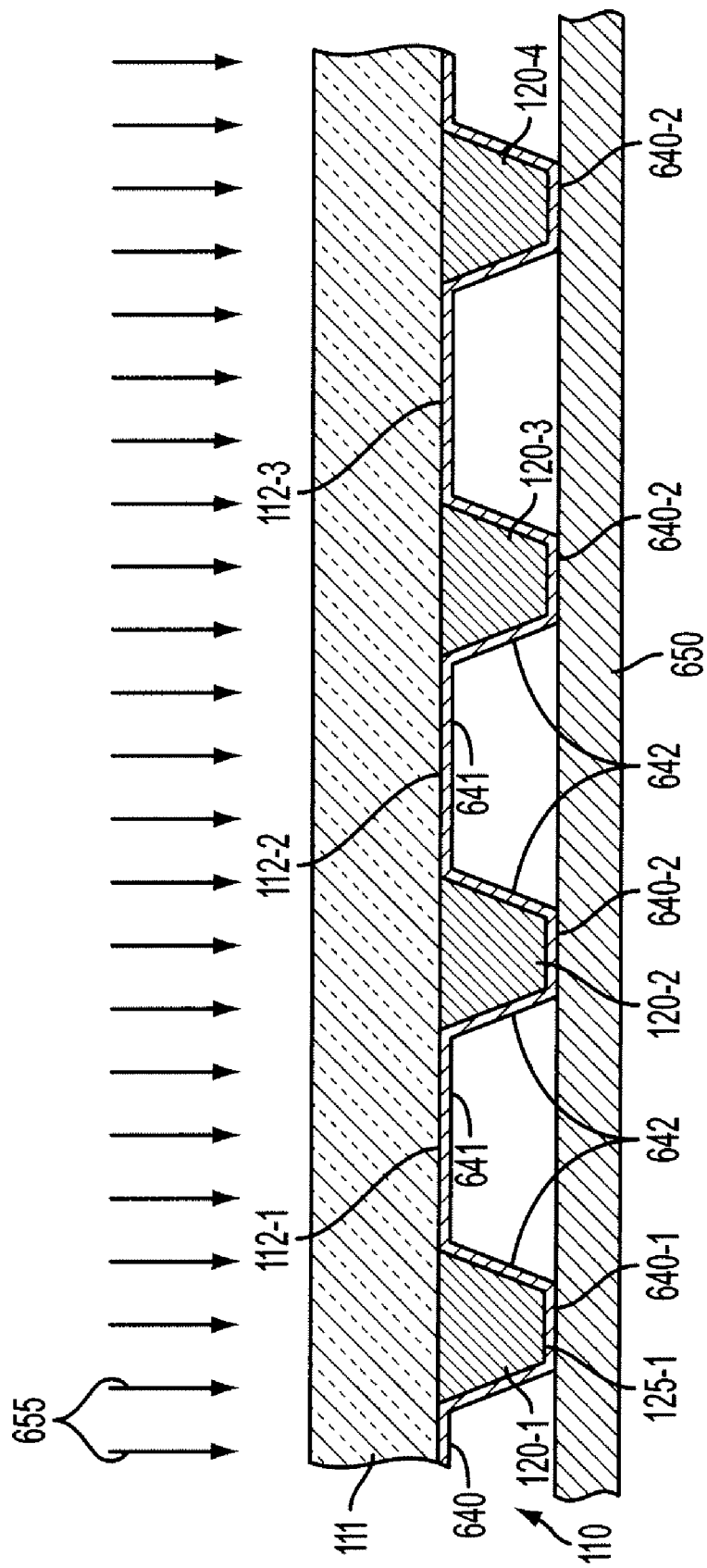
Figure 6D:
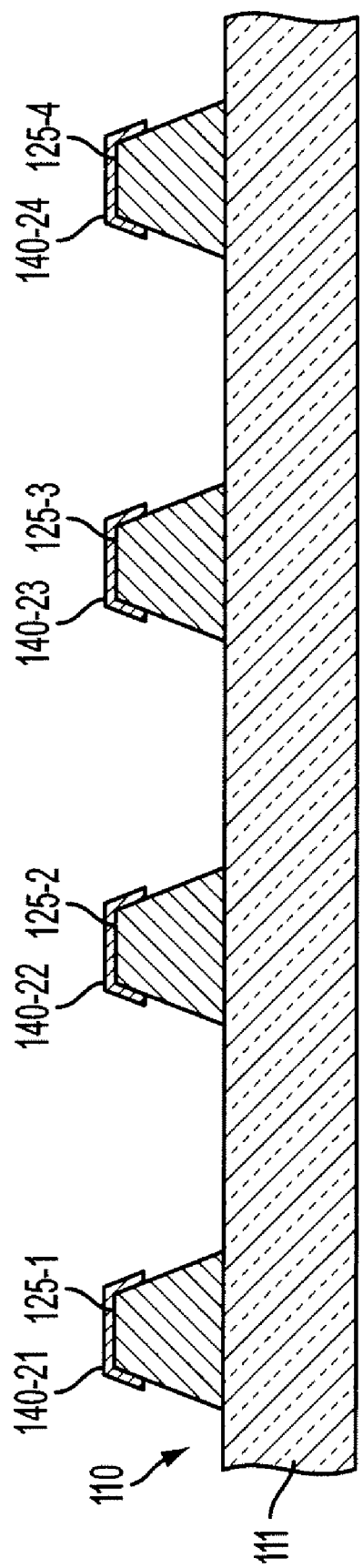

Referring to FIG. 6(A), after $O_2$ plasma activation (see FIG. 4), BM glass 110 is immersed into an OTS (or other hydrophobic material) solution 620 contained in a tub 610. As shown in FIG. 6(B), the resulting OTS layer 640 includes lower portions 641 disposed on lower surfaces 112-1 to 112-3, side wall portions 642 disposed on side wall surfaces 122 (e.g., side wall surfaces 122-1 and 122-2), and upper wall portions 645 disposed on upper wall surfaces 125-1 and 125-2. Next, BM glass 110 is mounted top down on a sheet 650 such that upper wall portions 645 of OTS layer 640 are pressed against sheet 650, and side walls portions 642 and lower portions 641 are disposed away from sheet 650. BM glass 110 with sheet 650 attached is then placed in an $O_2$ environment, and ultraviolet (UV) light 655 is directed through transparent substrate 111 onto the underside of OTS layer 640. Under these conditions, OTS layer 640 is etched away only in those areas where UV radiation and $O_2$ coexist because the etching reaction proceeds through the formation of $O_3$. This etching process produces a "micro-reactor" adjacent to side walls 122 and lower walls 112 of each well 130-1 to 130-3, which removes side walls portions 642 and lower portions 641 to render the underlying surfaces hydrophilic, but leaves upper wall portions 645 of OTS layer 640. FIG. 6(D) shows the resulting BM glass 110 including substrate 111 and walls 120-1 to 120-4, with OTS (hydrophobic material) portions 140-1 to 140-4 disposed on upper wall surfaces 125-1 to 125-4.

A possible drawback associated with the masking scheme shown in FIGS. 6(A) to 6(D) is that transparent substrate 111 absorbs part of the UV radiation, making the etching process lengthy.

Figure 7:
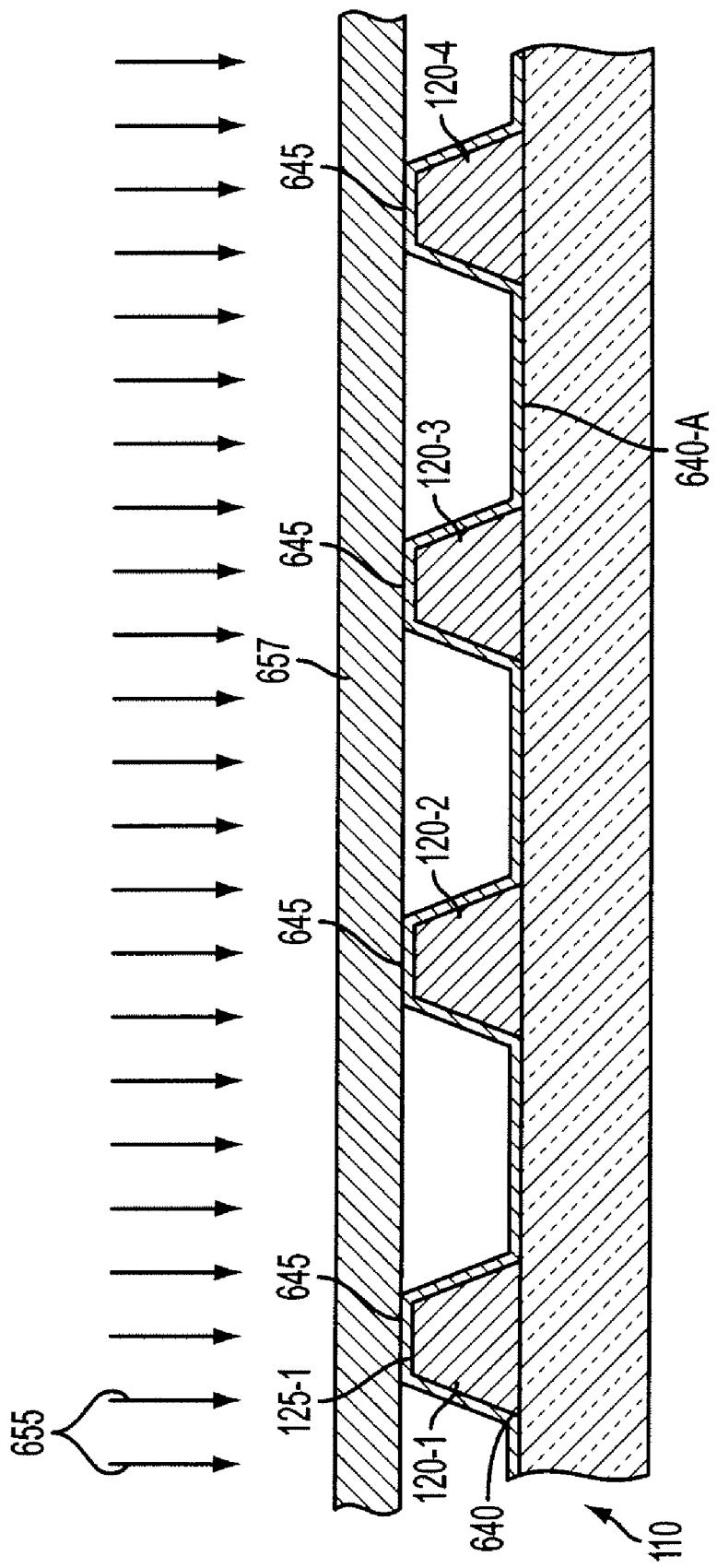
FIG. 7 is a simplified cross-sectional side view depicting an alternative to the embodiment of FIGS. 6(A)-6(D)

FIG. 7 shows another embodiment that addresses the potential drawbacks associated with the process of FIGS. 6(A) to 6(D) in which a transparent cover sheet (e.g. quartz) 657, whose absorption spectrum is such as to let enough UV radiation through to produce the desired $UV/O_2$ micro-reaction, is mounted on upper wall surfaces 125-1 to 125-4 of activated BM glass 110, and UV light is directed through transparent cover sheet 660 using a front-exposure process. As in the previous embodiment, upper wall portions 645 of OTS layer 640 are exposed to the UV radiation, but no oxygen is available to promote the etching reaction, thus causing these portions to remain attached to walls 120-1 to 120-4.

Figure 8A:
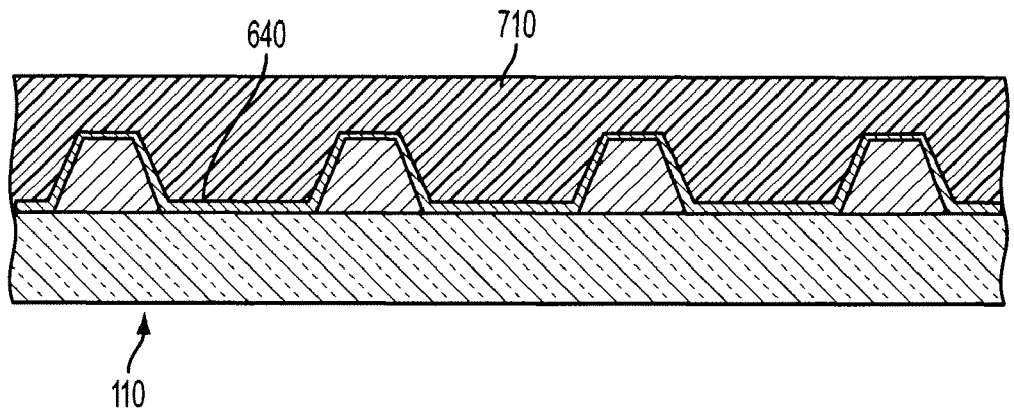
FIGS. 8(A), 8(B), 8(C), 8(D) and 8(E) are simplified cross-sectional side views depicting a method for producing a color filter array according to another specific embodiment of the present invention.
Figure 8B:
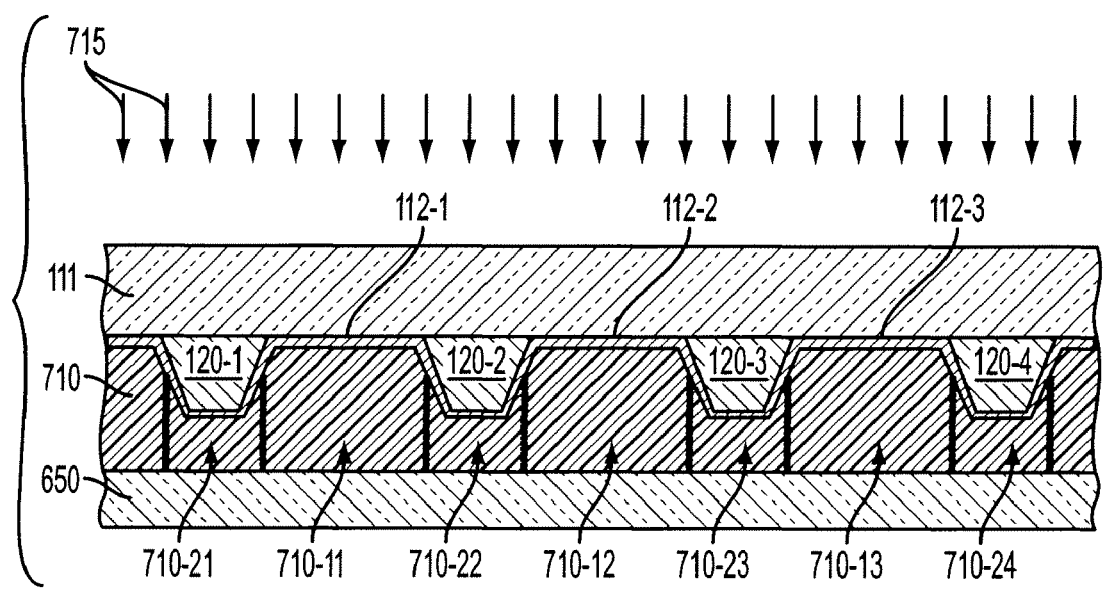
Figure 8C:
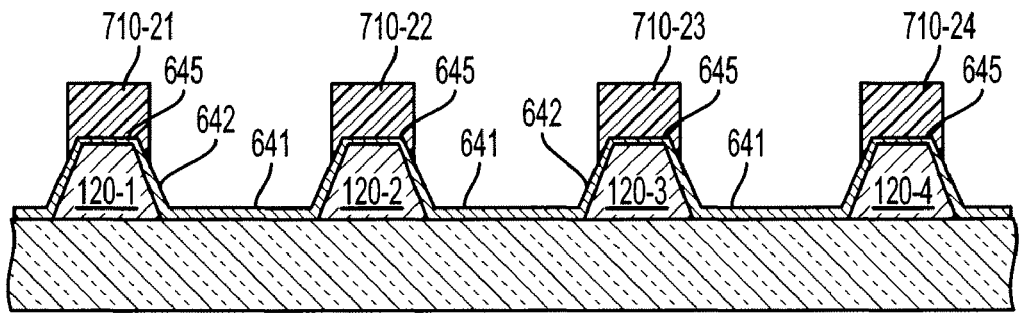
Figure 8D:
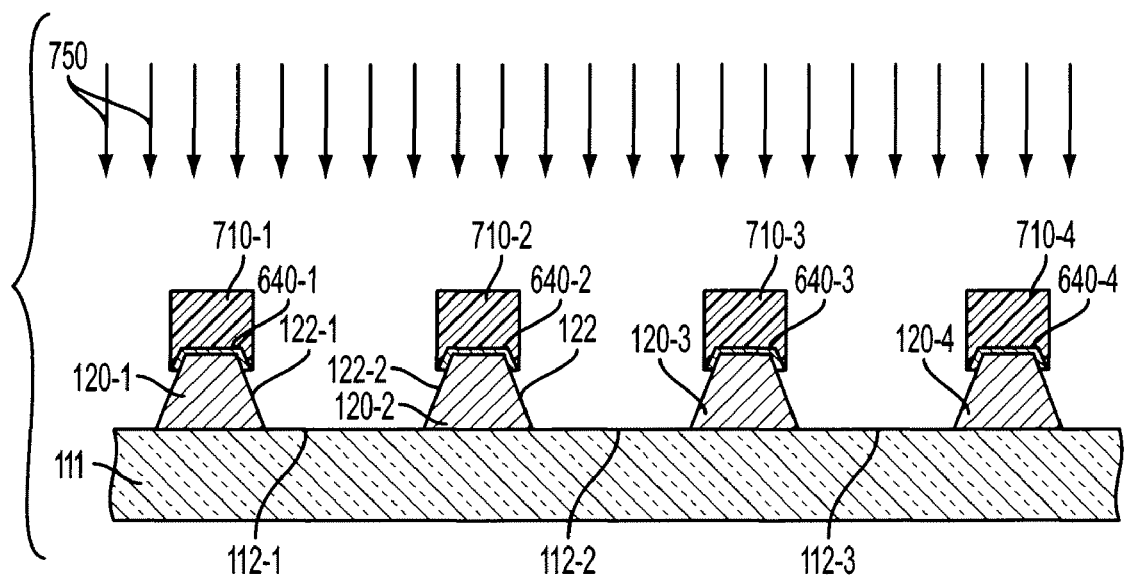
Figure 8E:
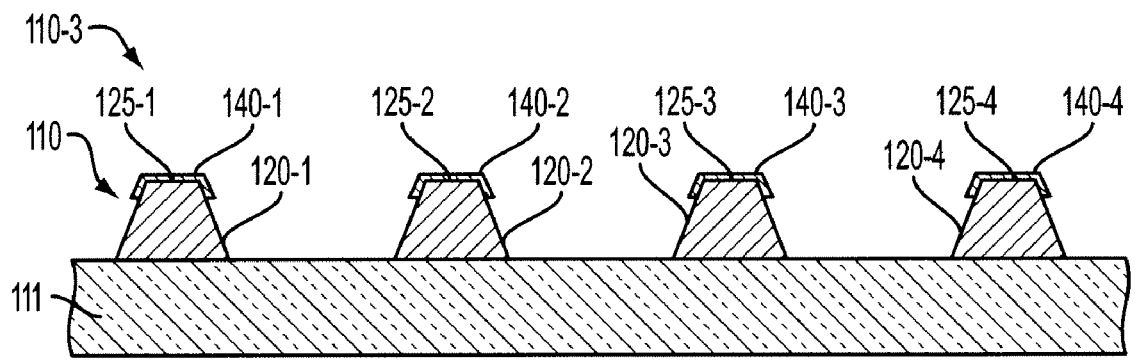

FIGS. 8(A) to 8(E) depicts another embodiment that begins with the activation process of FIG. 4 and the immersion process of FIG. 6(A). As indicated in FIG. 8(A), a photoresist layer 710 is spun over OTS layer 640 using known techniques. As shown in FIG. 8(B), a backside exposure/development process is performed in which light 715 is directed through transparent substrate 111 and OTS layer 640 to selectively expose first portions 710-11 to 710-13 of the photoresist layer 710 that are disposed over lower surfaces 112-1 to 112-3 (i.e., between walls 120-1 to 120-4). Note that walls 120-1 to 120-4 serve as a mask during the backside exposure to prevent exposure of second portions 710-21 to 710-24 that are located under walls 120-1 to 120-4. Next, as shown in FIG. 8(C), the exposed/developed first portions of the photoresist layer are removed (stripped) to expose side wall portions 642 and lower wall portions 641 of OTS layer 640. Note that second portions 710-21 to 710-24 are retained over upper wall portions 645 formed on walls 120-1 to 120-4. As indicated in FIG. 8(D), exposed side wall portions 642 and lower wall portions 641 of OTS layer 640 are then removed (etched) using an $O_2$ RF plasma treatment (indicated by arrows 750) to both expose and selectively control the surface energy of lower surfaces 112-1 to 112-3 of substrate 111 and side wall surfaces 122 (e.g., surfaces 122-1 and 122-2) of each wall 120-1 to 120-4. Finally, as shown in FIG. 8(E), the remaining photoresist portions are removed from over walls 120-1 to 120-4, whereby the remaining portions of OTS layer form hydrophobic material portions 140-1 to 140-4 on upper wall surfaces 125-1 to 125-4. A possible problem associated with this embodiment is that adhesion of OTS layer 640 on walls 120-1 to 120-4 is not very strong, and therefore this process may not always successful—when second photoresist portions 710-21 to 710-23 are stripped, some of the OTS material disposed on upper wall surfaces 125-1 to 125-4 may be stripped as well.

FIGS. 9(A)-9(F), 10(A)-10(C), and 11(A)-11(C) depict three specific embodiments in which hydrophobic material is applied after a photoresist mask 810 is formed over side wall surfaces (e.g., surfaces 122-1 and 122-2) and lower surface (e.g., 112-1) of each well 130-1 to 130-3, and then depositing hydrophobic material 140 onto exposed upper wall surfaces 125-1 to 125-4 of walls 125-1 to 125-4 using the immersion process described above. These embodiments provide an advantage in that they eliminate the potential problem of removal of OTS upon stripping the photoresist.

Figure 9A:
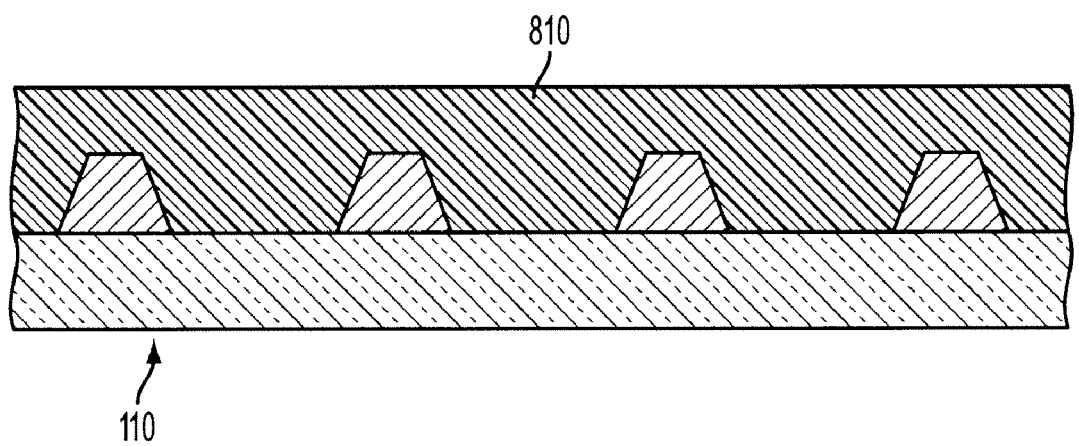
FIGS. 9(A), 9(B), 9(C), 9(D), 9(E) and 9(F) are simplified cross-sectional side views depicting a method for producing a color filter array according to another specific embodiment of the present invention.
Figure 9B:
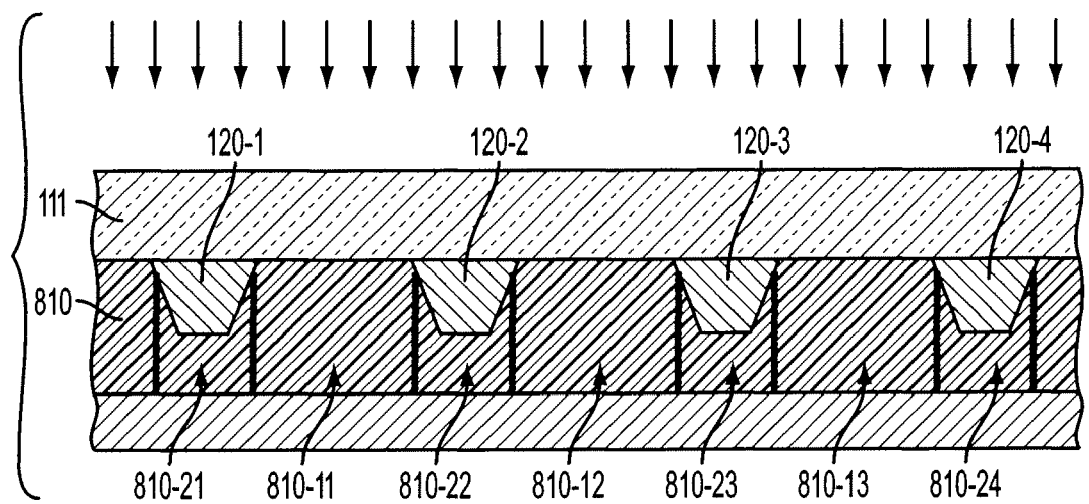
Figure 9C:
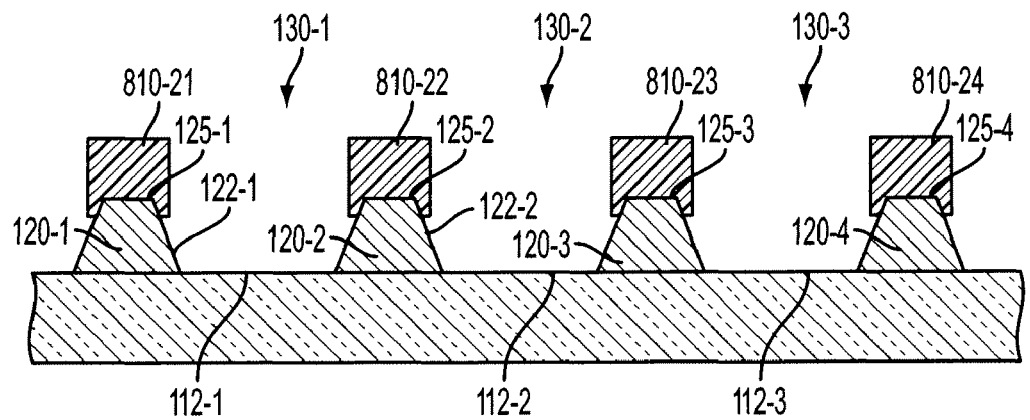
Figure 9D:
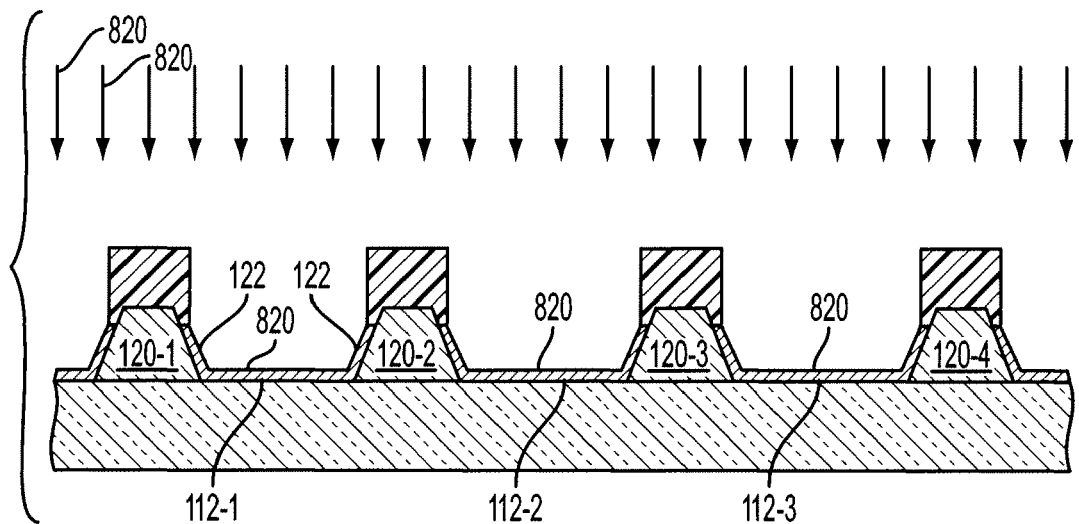
Figure 9E:
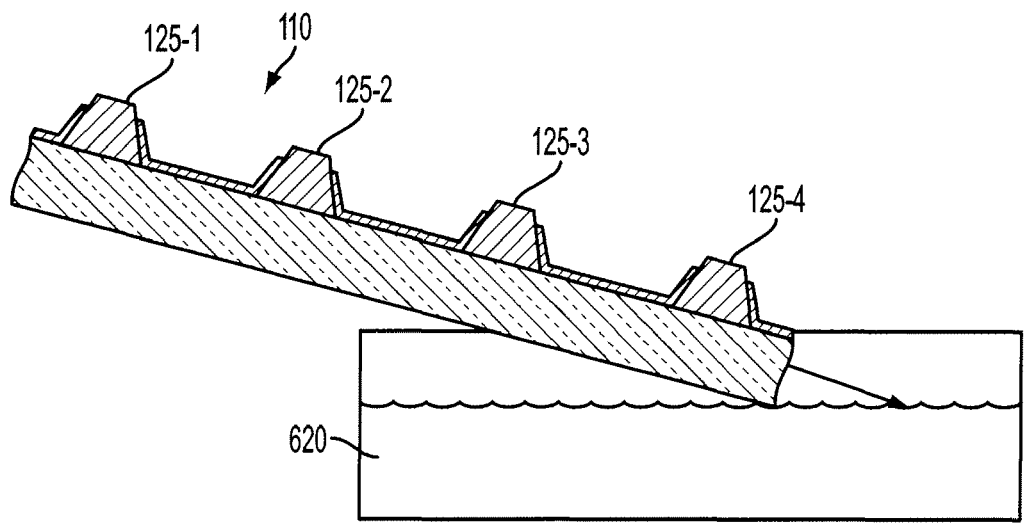
Figure 9F:
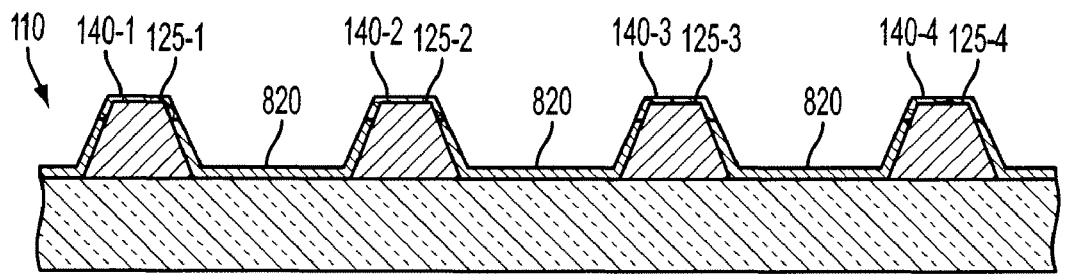

FIGS. 9(A)-9(F) depict an embodiment that utilizes two surface treatments and a photoresist/backside exposure. In FIG. 9(A), a photoresist layer 810 is formed over BM glass 110. In FIG. 9(B), photoresist layer 810 is subjected to a backside expose/develop process in which light is directed through transparent substrate 111 to selectively expose/develop first portions 810-11 to 810-13 of the photoresist layer 810 disposed over the lower surfaces. As in the previous embodiment, walls 120-1 to 120-4 mask second portions 810-21 to 810-24 of the photoresist layer 810 to prevent exposure. Next, in FIG. 9(C), the first portions of the photoresist layer are removed to expose the side wall surfaces (e.g., surfaces 122-1 and 122-2) and the lower surfaces 112-1 to 112-3 of each of the wells 130-1 to 130-3, with upper wall surfaces 125-1 to 125-4 of walls 120-1 to 120-4 remaining covered by second mask portions 810-21 to 810-24. Next, as shown in FIG. 9(D) a hydrophilic material 820 is deposited on side walls 122 of each wall 120-1 to 120-4 and exposed lower surfaces 112-1 to 112-3. In one embodiment, hydrophilic material 820 is phen-ethyl-trichlorosilane (PETS), which adheres well to glass (e.g., lower surfaces 112-1 to 112-3) and is thus not washed out upon photoresist stripping. Next, as shown in FIG. 9(E), the remaining (first) portions of the photoresist layer are stripped to expose upper wall surfaces 125-1 to 125-4, and BM glass 110 is immersed into OTS solution 620 in the manner described above. FIG. 9(F) shows processed BM glass 100 the OTS solution forms the desired SAM (hydrophobic material) portions 140-1 to 140-4 on upper wall surfaces 125-1 to 125-4, but is prevented from adhering to other surfaces by PETS layer 820.

Figure 10A:
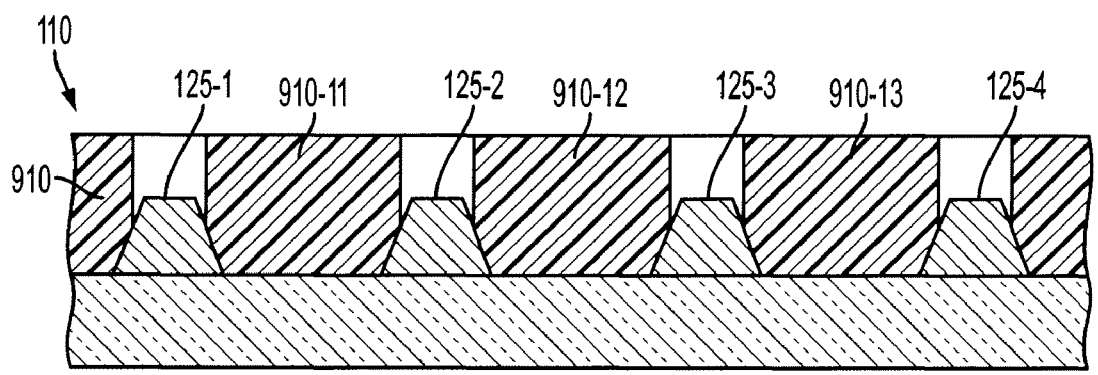
FIGS. 10(A), 10(B) and 10(C) are simplified cross-sectional side views depicting a method for producing a color filter array according to a specific embodiment of the present invention.
Figure 10B:
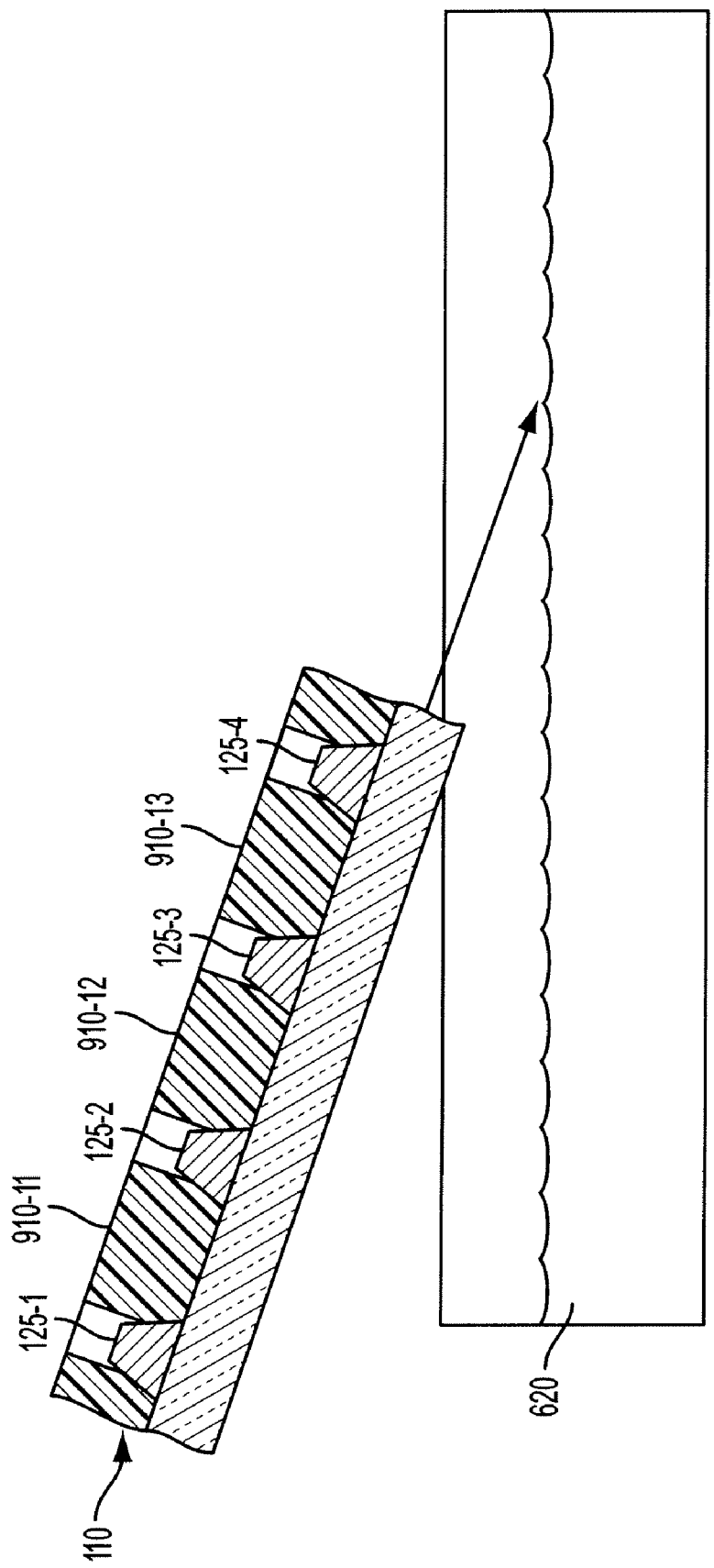
Figure 10C:
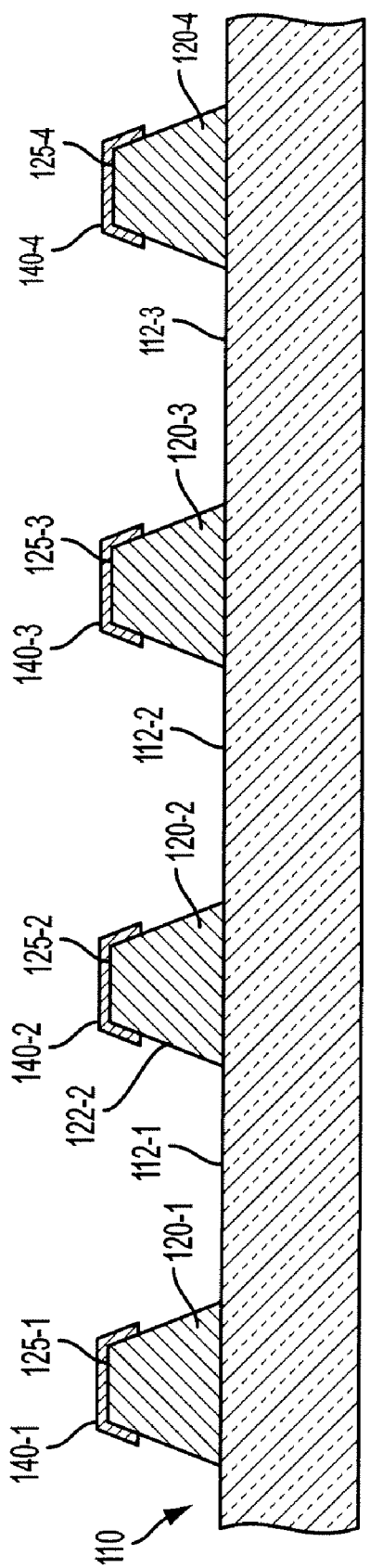
Figure 11A:
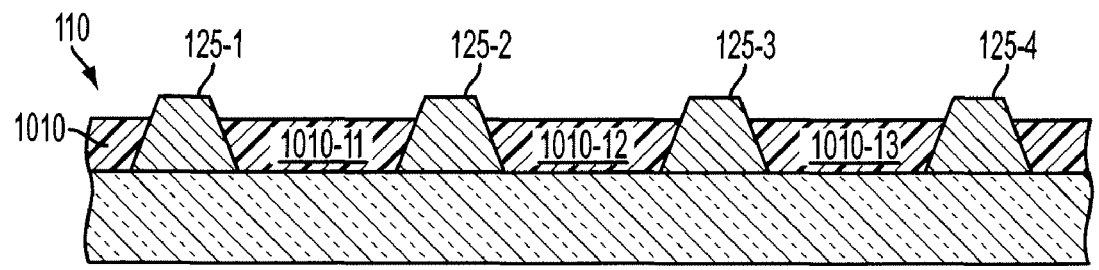
FIGS. 11(A), 11(B) and 11(C) are simplified cross-sectional side views depicting a method for producing a color filter array according to a specific embodiment of the present invention.
Figure 11B:
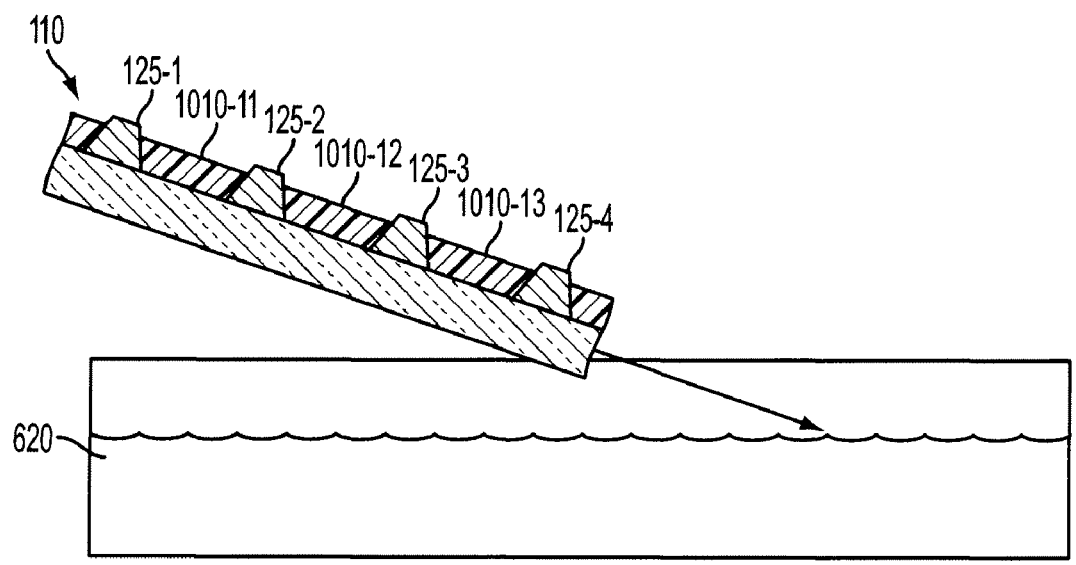
Figure 11C:
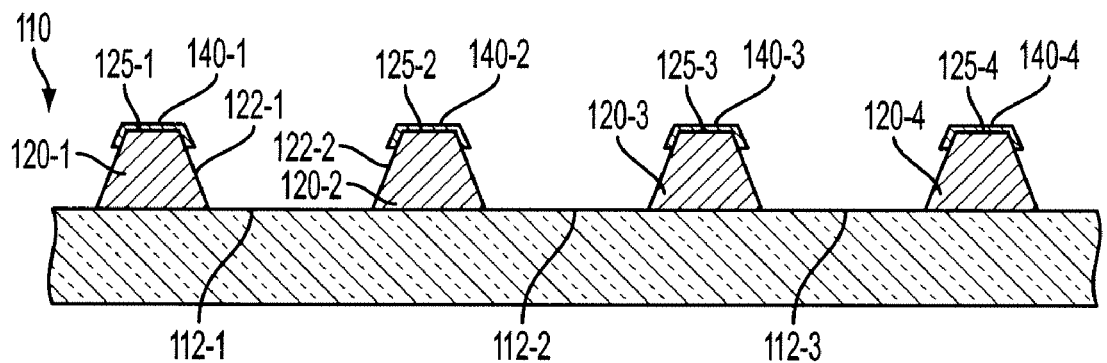

FIGS. 10(A) to 10(C) and 11(A) to 11(C) depict further embodiments utilizing an image reversal process in which photoresist mask 910 is formed and subjected to backside exposure as described above with reference to FIGS. 9(A) and 9(B), but in this case a negative tone is obtained from a positive tone resist, and exposed (first) portions 910-11 to 910-13 are retained after the initial stripping process to expose upper wall surfaces 125-1 to 125-4, as shown in FIG. 10(A). A similar arrangement of retained mask portions 1010-11 to 1010-13 of a mask 1010 are shown in FIG. 11(A). Note that the feature size of BM-glass 110 is such that loss of resolution during the image reversal/stripping process is not relevant. Controlling the exposure/development time provides control over whether only upper wall surfaces 125-1 to 125-4 will be exposed (as indicated in FIG. 10(A), or if part of the side wall surfaces (e.g. side walls surfaces 122-1 and 122-2) will be exposed (see FIG. 11(A)). Next, as shown in FIGS. 10(B) and 11(B), BM glass 110 is immersed into OTS solution 620 in the manner described above, where mask portions 910-11 to 910-13 and 1010-11 to 1010-13 prevent the deposition of OTS on any surface other than exposed upper wall surfaces 125-1 to 125-4. Finally, as shown in FIGS. 10(C) and 11(C), the remaining photoresist portions are removed to expose the side wall surfaces (e.g. side walls surfaces 122-1 and 122-2) of each wall 120-1 to 120-4 and lower surfaces 112-1 to 112-3. Because OTS is not disposed under any portion of the photoresist mask during the stripping process (as in previous embodiments), the problems associated with poor adhesion of OTS to BM glass 110 are avoided.

Figure 12A:
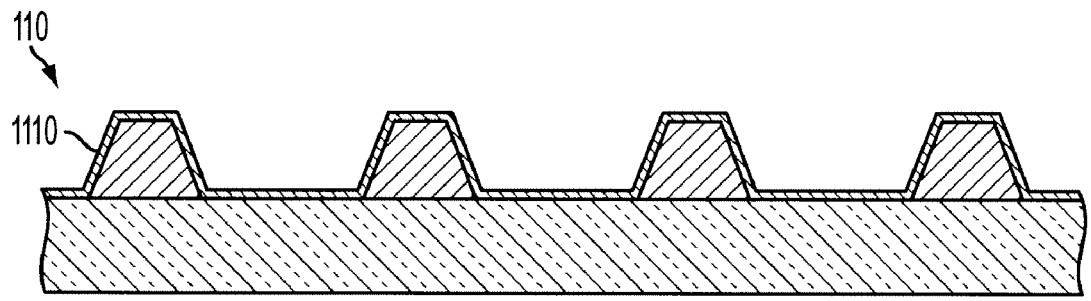
FIGS. 12(A), 12(B) and 12(C) are simplified cross-sectional side views depicting a method for producing a color filter array according to a specific embodiment of the present invention.
Figure 12B:
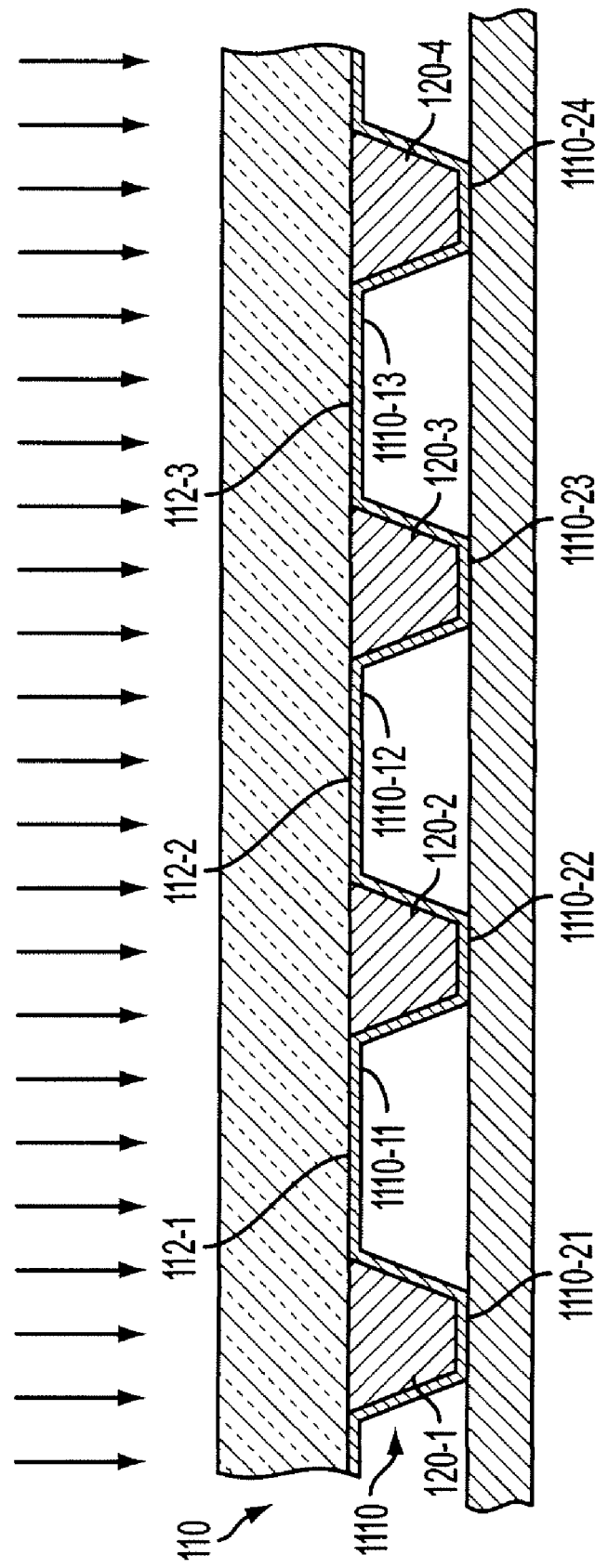
Figure 12C:
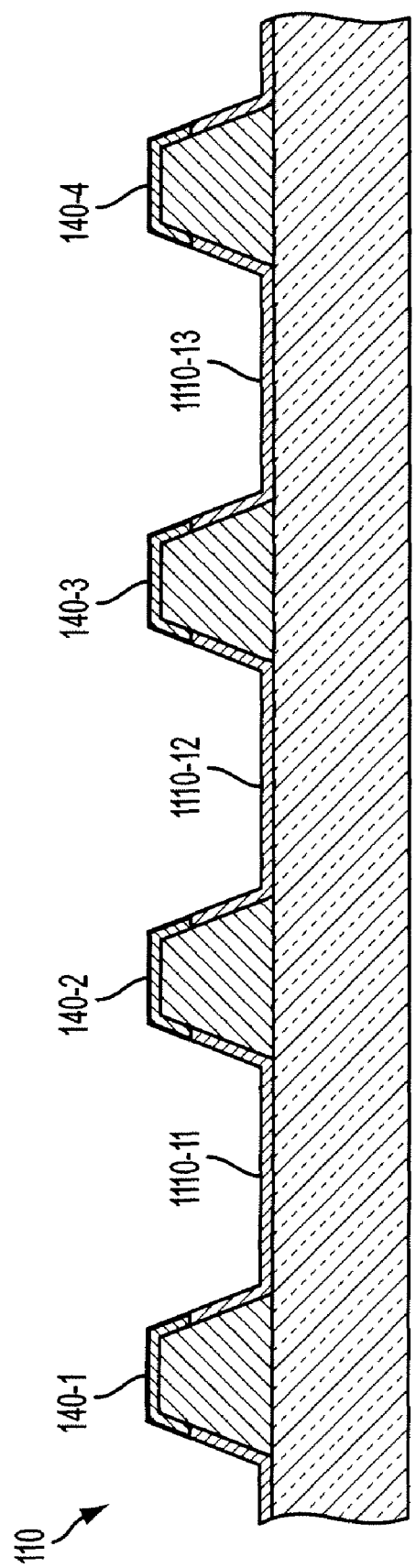

FIGS. 12(A) to 12(C) depict yet another embodiment in which a photodefinable surface treatment (e.g., Hydrophobic fluoropolymer additive components from AGC Chemicals, Japan) that has the property of changing phobicity (i.e., surface energy) upon UV exposure is deposited as a photodefinable layer 1110 over BM glass 110 (FIG. 12(A)). In one embodiment, photodefinable layer 1110 has a first, relatively low surface energy (i.e., photodefinable layer 1110 is initially hydrophobic). BM glass 110 is then subjected to a backside exposure similar to that described above (FIG. 12(B)). In this case, the backside exposure provides the desired selective surface energy control by increasing the surface energy of the exposed (first) portions 1110-11 to 1110-13 of the photodefinable material layer 1110 disposed over lower surfaces 112-1 to 112-3, and utilizing walls 120-1 to 120-4 to maintain portions disposed thereon at the initial (relatively hydrophobic) surface energy. The processed BM glass 110 is shown in FIG. 12(C), where unactivated portions of the photodefinable layer form hydrophobic material portions 140-1 to 140-4, and activated portions 1110-11 to 1110-13 provide the desired hydrophilic characteristics. The difference with previous embodiments is that the reaction that causes the phobicity to change is a photocleaving reaction requiring no presence of $O_2$, and not an etching reaction.

Although the present invention has been described with respect to certain specific embodiments, it will be clear to those skilled in the art that the inventive features of the present invention are applicable to other embodiments as well, all of which are intended to fall within the scope of the present invention. For example, in other embodiments base structures are used in place of the BM glass described herein.

The invention claimed is:

1. A method for producing a color filter array comprising:
    depositing a hydrophobic material onto a base structure including a plurality of walls disposed on a transparent substrate, wherein the plurality of walls define a plurality of wells, each well including a lower surface, side wall surfaces surrounding the lower surface, and upper wall surfaces defined at an upper end of the side wall surfaces, and wherein depositing the hydrophobic material comprises patterning the hydrophobic material on the upper wall surfaces such that the upper wall surfaces surrounding each of the wells have a first surface energy that is lower than a second surface energy of the side wall surfaces and the lower surface of said each well; and
    inserting a plurality of color filter inks into the plurality of wells such that the color filter ink fills at least one associated well of the plurality of wells.

2. The method of claim 1, wherein inserting the plurality of color filter inks comprises positioning an ink jet printer head over the plurality of wells, and causing the ink jet printer head to eject the plurality of color filter inks into the plurality of wells.

3. The method of claim 1, further comprising curing the plurality of color filter inks, whereby residual color filter material disposed in each of the color filter inks forms a color filter in an associated well.

4. The method of claim 1, wherein depositing a hydrophobic material comprises disposing a self-assembling monolayer (SAM) on the upper wall surfaces surrounding each of the wells.

5. The method of claim 4, wherein disposing the SAM comprises disposing octadecyl-trichlorosilane (OTS) on the upper wall surfaces surrounding each of the wells.

6. The method of claim 1,
    wherein the transparent substrate comprises a glass substrate having an upper surface, and
    wherein the method further comprises forming the base structure by depositing a layer of opaque polyimide-based material on the glass substrate, and etching selected portions of the layer to form said plurality of walls.

7. The method of claim 1, further comprising, before depositing the hydrophobic material, activating the plurality of wells such that surface energies of the lower surface, the side wall surfaces and the upper wall surfaces of each well are increased.

8. The method of claim 7, wherein activating the plurality of wells comprises oxidizing the lower surface, the side wall surfaces and the upper wall surfaces of each well using a radio-frequency (RF) plasma.

9. The method of claim 7, wherein depositing said hydrophobic material comprises:
forming a layer of the hydrophobic material onto a flat elastomeric stamp structure;
conformally contacting the flat elastomeric stamp onto the plurality of walls such that the hydrophobic material contacts the upper wall surfaces of each of the wells; and
removing the elastomeric stamp structure, whereby the hydrophobic material remains adhered to the upper wall surfaces.

10. The method of claim 9, wherein the hydrophobic material comprises octadecyl-trichlorosilane (OTS) in a hexadecane solution.

11. The method of claim 7, wherein depositing said hydrophobic material comprises:
forming a hydrophobic material layer on the lower surface, the side wall surfaces, and upper wall surfaces of each of the plurality of wells; and
selectively removing side wall potions and lower wall portions of the hydrophobic material layer respectively disposed on the side wall surfaces and the lower surface of each well.

12. The method of claim 11, wherein forming the hydrophobic material layer comprises immersing the base structure into a solution containing the hydrophobic material.

13. The method of claim 11, wherein selectively removing said side wall portions and lower wall portions of the hydrophobic material layer comprises exposing said side wall portions and lower wall portions to both ultraviolet (UV) light and oxygen.

14. The method of claim 13, wherein said exposing comprises pressing upper wall portions of said hydrophobic material layer against a sheet, and directing said UV light through said transparent substrate onto said hydrophobic material layer.

15. The method of claim 13, wherein said exposing comprises pressing upper wall portions of said hydrophobic material layer against a transparent cover sheet, and directing said UV light through said transparent sheet onto said hydrophobic material layer.

16. The method of claim 12, wherein selectively removing said side wall portions and lower wall portions of the hydrophobic material layer comprises:
forming a photoresist layer over the hydrophobic material layer;
directing light through said transparent substrate and said hydrophobic material layer to selectively expose first portions of the photoresist layer disposed over the lower wall surfaces, wherein the plurality of walls mask second portions of the photoresist layer to prevent exposure of said second portions;
removing said first portions of the photoresist layer to expose said side wall portions and said lower wall portions; and
removing said exposed side wall portions and said lower wall portions.

17. The method of claim 1, wherein depositing said hydrophobic material comprises:
forming a mask over the side wall surfaces and the lower surface of each well such that the upper wall surface of each wall is exposed through said mask; and
depositing a hydrophobic material onto the exposed upper wall surfaces.

18. The method of claim 17, wherein depositing said hydrophobic material comprises immersing the base structure into a solution containing the hydrophobic material.

19. The method of claim 17, wherein forming said mask comprises:
forming a photoresist layer over the base structure;
directing light through said transparent substrate to selectively expose first portions of the photoresist layer disposed over the lower surfaces, wherein the plurality of walls mask second portions of the photoresist layer to prevent exposure of said second portions; and
removing the second portions of the photoresist layer to expose the upper wall surface of each of the wells.

20. The method of claim 19, wherein forming said mask further comprises:
before removing the second portions, removing said first portions of the photoresist layer to expose said side wall surfaces and said lower surfaces; and
depositing a hydrophilic material on said exposed side wall surfaces and said exposed lower surfaces.

21. The method of claim 20, wherein depositing said hydrophilic material comprises depositing phen-ethyl-trichlorosilane (PETS).

22. The method of claim 19, further comprising removing said second portions of said photoresist layer.

23. The method of claim 1, wherein depositing the hydrophobic material comprises:
forming a photodefinable material layer on the lower surface, the side wall surfaces, and upper wall surfaces of each of the plurality of wells, wherein the photodefinable material layer has a first, relatively low surface energy; and
directing light through said transparent substrate to selectively expose first portions of the photodefinable material layer disposed over the lower surfaces, thereby increasing a surface energy of the first portions to a second, relatively high surface energy.

* * * * *